US012622451B2

(12) United States Patent
Kelm et al.

(10) Patent No.: US 12,622,451 B2
(45) Date of Patent: May 12, 2026

(54) GRAPE SEED EXTRACTS AND RELATED SYSTEMS AND METHODS OF MANUFACTURE

(71) Applicant: E. & J. Gallo Winery, Modesto, CA (US)

(72) Inventors: Mark A. Kelm, Fresno, CA (US);
Peter Park, Fresno, CA (US)

(73) Assignee: E. & J. Gallo Winery, Modesto, CA (US)

( * ) Notice: Subject to any disclaimer, the term of this patent is extended or adjusted under 35 U.S.C. 154(b) by 459 days.

(21) Appl. No.: 18/190,682

(22) Filed: Mar. 27, 2023

(65) Prior Publication Data

US 2024/0324643 A1     Oct. 3, 2024

(51) Int. Cl.
*A23L 33/11*     (2016.01)
(52) U.S. Cl.
CPC ..................................... *A23L 33/11* (2016.08)
(58) Field of Classification Search
CPC ................................. A23L 3/11; A23L 33/105
See application file for complete search history.

(56) References Cited

U.S. PATENT DOCUMENTS

| | | | |
|---|---|---|---|
| 6,544,581 B1 * | 4/2003 | Shrikhande | ............. C09B 61/00 |
| | | | 426/655 |
| 7,566,401 B2 | 7/2009 | Kelm et al. | |
| 8,075,929 B2 | 12/2011 | Shrikhande et al. | |

| | | | |
|---|---|---|---|
| 9,592,265 B2 | 3/2017 | Kappagoda et al. | |
| 11,221,179 B2 | 1/2022 | Ortiz et al. | |
| 2007/0078261 A1 | 4/2007 | Robbins et al. | |
| 2009/0035432 A1 | 2/2009 | Mantius et al. | |
| 2014/0271988 A1 | 9/2014 | Robinson et al. | |
| 2015/0336981 A1 | 11/2015 | Orchard-Jardine et al. | |
| 2017/0106037 A1 | 4/2017 | Ianiro et al. | |
| 2018/0303895 A1 | 10/2018 | Ianiro et al. | |
| 2019/0282648 A1 | 9/2019 | Fisher et al. | |

OTHER PUBLICATIONS

International Search Report and Written Opinion regarding International App. No. PCT/US24/20153, mailed Jul. 30, 2024.
Rodriquez. Invitation to Pay Additional Search Fees. PCT/US24/20153, mailed May 28, 2024.

* cited by examiner

*Primary Examiner* — Thuan D Dang
(74) *Attorney, Agent, or Firm* — Dentons US LLP

(57)          ABSTRACT

Grape seed extract compositions and related systems and methods for manufacture are provided. The methods can include obtaining a grape seed extract source material; filtering the grape seed extract source material to obtain a first retentate and a first permeate; drying the first retentate to obtain a first grape seed extract having a first mean degree of polymerization; filtering the first permeate to obtain a second retentate and a second permeate; drying the second retentate to obtain a second grape seed extract having a second mean degree of polymerization less than the first mean degree of polymerization; purifying the second permeate to obtain a purified liquid; and drying the purified liquid to obtain a third grape seed extract having a third mean degree of polymerization less than the second mean degree of polymerization.

6 Claims, 9 Drawing Sheets

Solvent 216

210

Regenerated Resin 212

Solvent and Tannins 218

Impurities and Water 214

210

Resin 212 with Adsorbed Tannins

Permeate 124 and/or Water

300

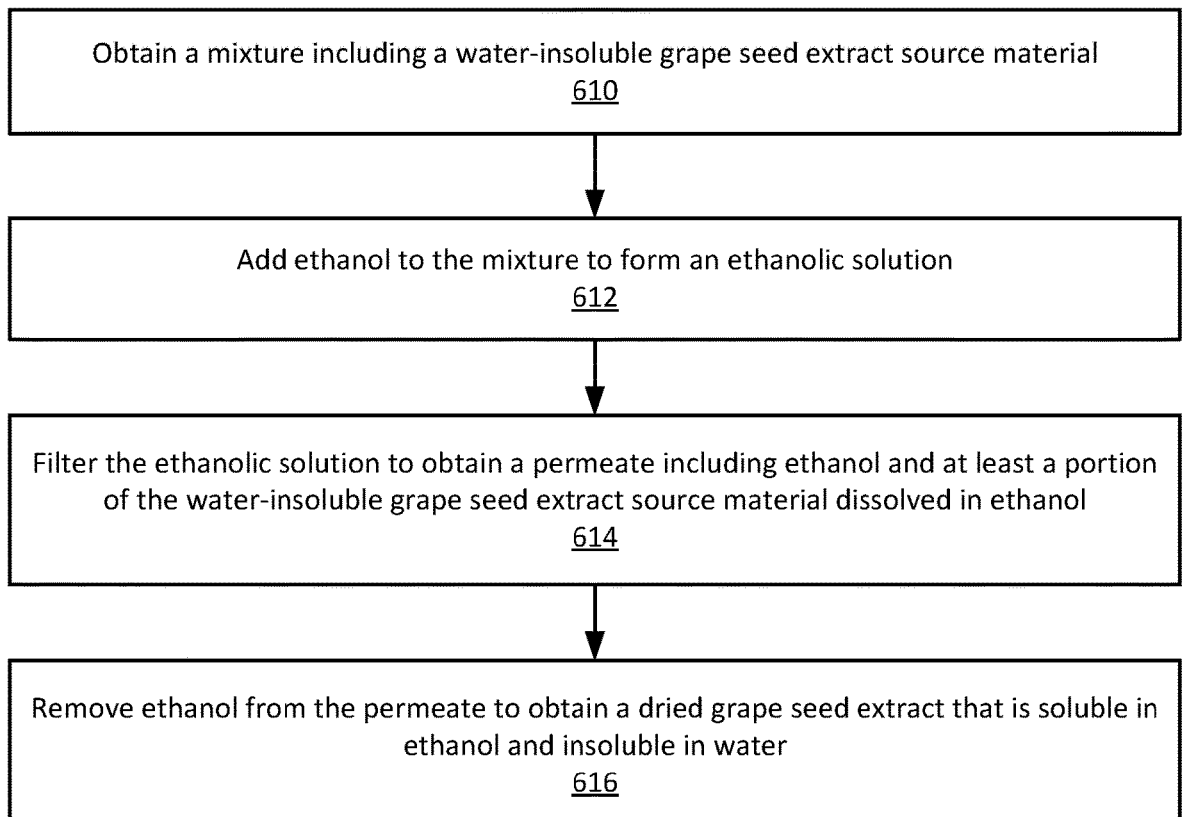

600

Obtain a mixture including a water-insoluble grape seed extract source material
610

Add ethanol to the mixture to form an ethanolic solution
612

Filter the ethanolic solution to obtain a permeate including ethanol and at least a portion of the water-insoluble grape seed extract source material dissolved in ethanol
614

Remove ethanol from the permeate to obtain a dried grape seed extract that is soluble in ethanol and insoluble in water
616

FIG. 6

GRAPE SEED EXTRACTS AND RELATED SYSTEMS AND METHODS OF MANUFACTURE

TECHNICAL FIELD

The present disclosure relates generally to grape seed extracts and systems and methods for producing the same.

BACKGROUND

Grape (*Vitis* spp.) seed extracts (GSEs) contain chemical compounds known as phenolics. Phenolic compounds can be defined structurally as possessing an aromatic ring with at least one hydroxyl group. Phenolics with multiple aromatic rings and hydroxyl groups can be referred to as polyphenols. Major classes of polyphenols include lignans, stilbenes, and flavonoids (e.g., flavanols). Polymers of flavanol monomers (e.g., catechin and epicatechin) can be referred to as tannins, condensed tannins, or proanthocyanidins (PAs). Sixteen types of proanthocyanidins commonly occur in woody and some herbaceous plants.

The grape berry contains two proanthocyanidin types: procyanidins (catechin, epicatechin, and epicatechin gallate subunits) and prodelphinidins (at least one gallocatechin subunit). Procyanidins can reside in seeds whereas procyanidins and prodelphinidins can both reside in skins. Grape proanthocyanidins can be characterized based on their degree of polymerization (DP), degree of galloylation (DG), subunit composition, branching, and interflavan bond linkage types. There are two types of interflavan bonds, B-type and A-type, joining subunits through C—C and C—O—C bonds, respectively linked. Cyclic proanthocyanidins may also exist. Proanthocyanidins can be present in other plant-based materials, including but not limited to: acacia, açaí, almond, apple, aronia, blueberry, buckwheat, cacao, cranberry, cinnamon, current, grapes, hops, legumes, litchi, oak, pine bark, peanut, persimmon, plum, quebracho, sorghum, tea, and wine.

The present disclosure provides novel grape seed extract compositions and related systems and methods for manufacture that overcome many of the challenges and limitations in the art. The compositions of the present disclosure can possess various levels of astringency and/or flavor characteristics, and can provide health or nutraceutical benefits. The present disclosure further provides systems and methods for converting a grape seed extract source material into a set of grape seed compositions, with each composition having a high monomer content, high oligomer content, or high polymer content. The systems and methods used to produce the compositions can utilize sequential membrane filtration, adsorption-elution purification, and refractance window drying, among other techniques.

SUMMARY OF THE INVENTION

In one aspect, the present disclosure provides a method for processing a grape seed extract. In some embodiments, the method comprises: obtaining a grape seed extract source material; filtering the grape seed extract source material to obtain a first retentate and a first permeate; drying the first retentate to obtain a first grape seed extract including a first mean degree of polymerization (e.g., from about 4.1 to about 5.3); filtering the first permeate to obtain a second retentate and a second permeate; drying the second retentate to obtain a second grape seed extract including a second mean degree of polymerization less than the first mean degree of polymerization (e.g., from about 2.2 to about 2.7); purifying the second permeate to obtain a purified liquid; and drying the purified liquid to obtain a third grape seed extract including a third mean degree of polymerization less than the second mean degree of polymerization (e.g., from about 1.2 to about 1.4). In certain embodiments, the grape seed extract source material is produced using a hot-water extraction process and a pectinase enzyme; or is produced using at least one of tannase or an acid additive. In other embodiments, filtering the grape seed extract source material comprises using an ultrafiltration filter having a molecular weight cutoff from about 80,000 Daltons to about 200,000 Daltons. In certain embodiments, drying the first retentate comprises concentrating the first retentate; or filtering the first permeate comprises using an ultrafiltration filter having a molecular weight cutoff from about 800 Daltons to about 5,000 Daltons. In still further embodiments, drying the second retentate comprises concentrating the second retentate; or purifying the second permeate comprises performing an adsorption-elution process to remove sugar and organic acid from the second permeate. In specific embodiments, the adsorption-elution process is performed using a resin column. In other embodiments, the purified liquid comprises catechin and epicatechin, and wherein a combination of the catechin and the epicatechin is present in the purified liquid from about 20% to about 41%, by weight, on a dry basis. In certain embodiments, drying the purified liquid comprises concentrating the purified liquid; or drying at least one of the first retentate, the second retentate, or the purified liquid comprises using a refractance window dryer. In some embodiments, the first mean degree of polymerization is greater than the second mean degree of polymerization, and the second mean degree of polymerization is greater than the third mean degree of polymerization. In particular embodiments, the first mean degree of polymerization is from about 4.1 to about 5.3, the second mean degree of polymerization is from about 2.2 to about 2.7, and the third mean degree of polymerization is from about 1.2 to about 1.4.

In another aspect, the present disclosure provides a system for processing a grape seed extract. The system comprising a source for a grape seed extract source material; a first filter configured to filter the grape seed extract source material to obtain a first retentate and a first permeate; a first dryer configured to dry the first retentate to obtain a first grape seed extract comprising a first mean degree of polymerization; a second filter configured to filter the first permeate to obtain a second retentate and a second permeate; a second dryer configured to dry the second retentate to obtain a second grape seed extract comprising a second mean degree of polymerization less than the first mean degree of polymerization; a purifier configured to purify the second permeate to obtain a purified liquid; and a third dryer configured to dry the purified liquid to obtain a third grape seed extract comprising a third mean degree of polymerization less than the second mean degree of polymerization. In some embodiments, the first filter comprises an ultrafiltration filter having a molecular weight cutoff from about 80,000 Daltons to about 200,000 Daltons; or the second filter comprises an ultrafiltration filter having a molecular weight cutoff from about 800 Daltons to about 5,000 Daltons. In other embodiments, at least one of the first dryer, the second dryer, or the third dryer comprises a refractance window dryer. In certain embodiments, the purifier comprises a resin column configured to perform an adsorption-elution process to remove sugar and organic acid from the second permeate. In other embodiments, the system further comprises at least one concentrator configured to concentrate at least one of the first retentate, the second retentate, or the purified liquid.

In yet another aspect, the present disclosure provides a grape seed extract comprising a mean degree of polymerization from about 1.2 to about 1.4; and phenols in an amount from about 80 to about 95 g GAE/100 g, on a dry basis. In certain embodiments, said grape seed extract further comprises at least one of: gallic acid in an amount from about 0.4% to about 3.9%, by weight, on a dry basis; a combination of catechin and epicatechin from about 20% to about 41%, by weight, on a dry basis; an epicatechin gallate (ecg) terminal unit percentage from about 0.9 to about 9.1; or an epicatechin gallate (ecg) extension unit percentage from about 1.4 to about 7.8.

In some aspects, the present disclosure provides a grape seed extract comprising a mean degree of polymerization from about 2.2 to about 2.7; and phenols in an amount from about 30 to about 60 g GAE/100 g, on a dry basis. In some embodiments, said grape seed extract further comprises gallic acid in an amount from about 0.3% to about 0.6%, by weight, on a dry basis; a combination of catechin and epicatechin from about 0.3% to about 2.6%, by weight, on a dry basis; an epicatechin gallate (ecg) terminal unit percentage from about 0 to about 14.4; or an epicatechin gallate (ecg) extension unit percentage from about 3.7 to about 11.5.

In other aspects, the present disclosure provides a grape seed extract comprising a mean degree of polymerization from about 4.1 to about 5.3; and phenols in an amount from about 61 to about 70 g GAE/100 g, on a dry basis. In certain embodiments, said grape seed extract further comprises a combination of catechin and epicatechin from about 0% to about 0.5%, by weight, on a dry basis; an epicatechin gallate (ecg) terminal unit percentage from about 0 to about 16; or an epicatechin gallate (ecg) extension unit percentage from about 5.6 to about 15.6.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 6 is a flowchart of a method of processing a grape seed extract, in accordance with certain embodiments.

DETAILED DESCRIPTION

Figure 1:
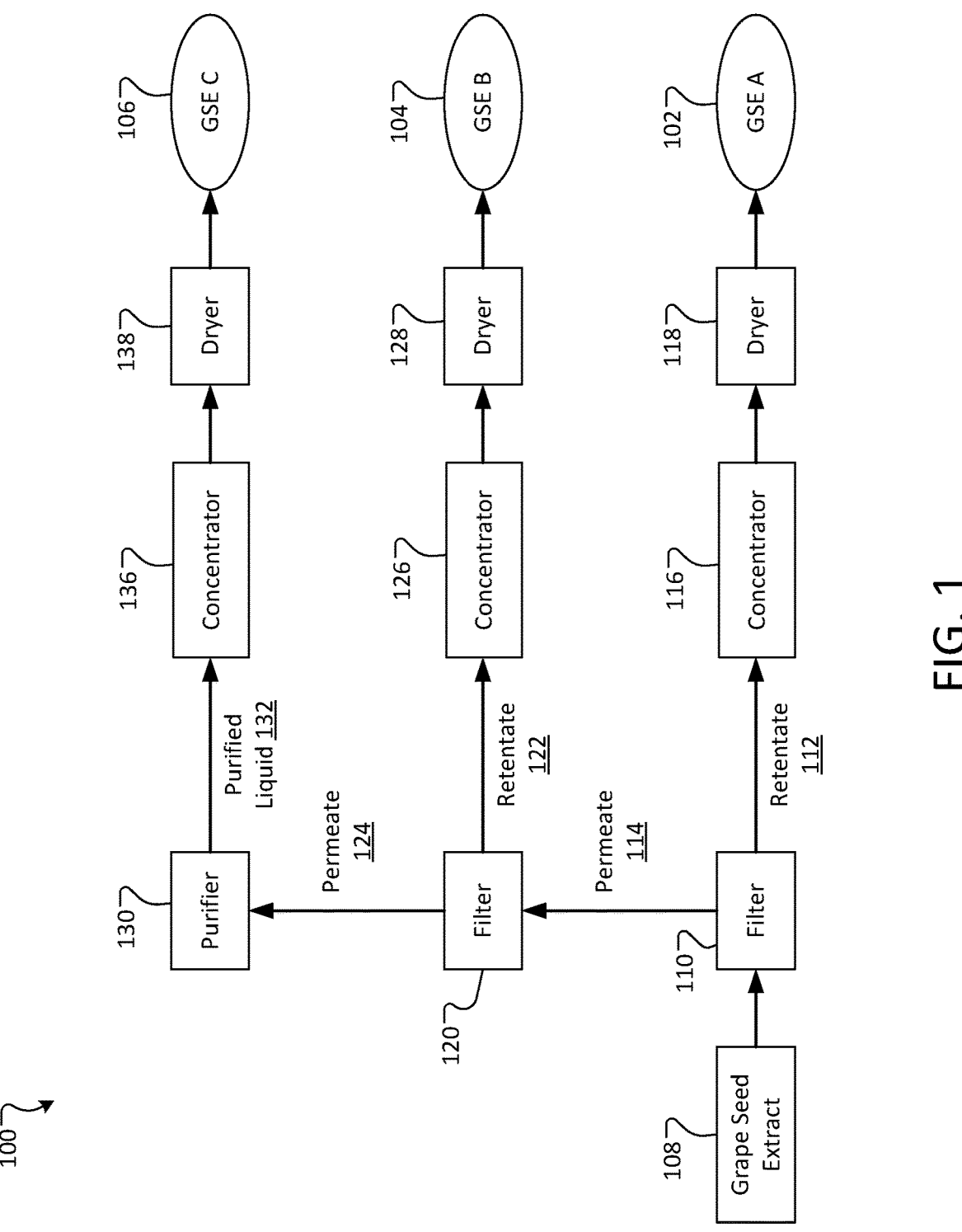
FIG. 1 is a block diagram of a system for producing grape seed extracts, in accordance with certain embodiments.

The invention allows for the processing of a grape seed extract and further provides grape seed extracts produced from the methods and systems described, representing a significant advance over the prior art. In particular, the processes provided herein allow for the production of unique grape seed extracts enriched with high monomer (e.g. 20-40% catechin/epicatechin by weight), high oligomer, or high polymer compositions. The extracts can possess differing levels of astringency, taste and various biological activities (e.g., antioxidant, anti-inflammatory, blood pressure lowering effect) based on their characteristics described herein. For example, the grape seed extracts described herein may comprise higher or lower monomer levels compared with grape seed extracts known in the art.

The methods and systems provided herein may use only water and ethanol; and, in some embodiments, combine sequential membrane filtration, resin purification, and refractance window drying (RWD) to produce compositionally unique grape seed extracts. In contrast, other methods rely on solvents such as n-butyl acetate or ether for selective purification of procyanidins and subsequent drying by thin film evaporation (US20070078261A1), or rely on potentially hazardous techniques (U.S. Pat. No. 6,544,581B1) or toxic solvents (U.S. Pat. No. 7,566,401B2); and are therefore not readily scalable or economically viable. Unlike these other processes, the methods, systems, and starting materials described herein are practical in a production setting, improve operator safety (explosion hazards potentially eliminated during RWD), minimize environmental impacts (no highly toxic chemicals used, no hazardous waste generated), and have lower energy requirements.

The following is a detailed description provided to aid those skilled in the art in practicing the embodiments disclosed herein. Modifications and variations to the embodiments described herein can be made without departing from the spirit or scope of the present disclosure.

Apparatus, systems, and methods are provided for processing a grape seed extract, which may include one or more steps of, obtaining, drying, filtering, concentrating, purifying, or separating the grape seed extract as described herein. It is contemplated that the apparatus, systems, methods, and compositions disclosed herein encompass variations and adaptations developed using information from the embodiments described herein. Adaptation and/or modification of the apparatus, systems, methods, and compositions described herein may be performed by those of ordinary skill in the relevant art. It is also understood that the features of the various embodiments described herein are not mutually exclusive and can exist in various combinations and permutations.

Any embodiment discussed herein with respect to one aspect of the disclosure applies to other aspects as well, unless specifically noted.

As used herein, "degree of polymerization" or "DP" refers to a number of monomer subunits in a molecule, such as a macromolecule, an oligomer molecule, or a polymer molecule. For example, a molecule having DP>10 can be considered a polymer, a molecule having $2 \leq DP \leq 10$ can be considered an oligomer, and a molecule having DP=1 can be considered a monomer.

As used herein, "mean degree of polymerization" or "mDP" can refer to a mean or average degree of polymerization for the molecules in a composition. For example, a composition containing an equal mixture of two types of molecules, with one molecule having DP=2 and the other molecule having DP=4 can have mDP=3. Additionally, the mDP can be represented as a decimal number, including but not limited to 7.0, 6.9, 6.8, 6.7, 6.6, 6.5, 6.4, 6.3, 6.2, 6.1, 6.0, 5.9, 5.8, 5.7, 5.6, 5.5, 5.4, 5.3, 5.2, 5.1, 5.0, 4.9, 4.8, 4.7, 4.6, 4.5, 4.4, 4.3, 4.3, 4.1, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, and 1.0. Standard techniques known in the art may be used to calculate mean degree of polymerization, terminal, and extension unit compositions. See Mattivi, F., et. al., Australian Journal of Grape and Wine Research 2009, 15, 25-35.

FIG. 1 depicts a block diagram of a system 100 for producing grape seed extract (GSE) compositions 102, 104, and 106 from a GSE source material 108, in accordance with the present disclosure. The GSE source material 108 can be or include an aqueous or alcoholic (e.g., ethanol) solution containing GSE. In the illustrated embodiments, the GSE source material 108 can be produced in a hot-water extraction process in which dry or fresh grape seeds are exposed GSE source material 108. Filtering aids (e.g., diatomaceous earth, perlite, cellulose fibers, paper pulp, etc.) may be employed, for example, in conjunction with dead-end filters to produce the GSE source material 108. Example processes for producing grape seed extract source materials are described in U.S. Pat. Nos. 6,544,581 and 8,075,929, the entire disclosure of each of which is incorporated by reference herein. In alternative embodiments, the GSE source material 108 can be produced from grape skins in addition to or instead of grape seeds, using the techniques described herein. Alternatively or additionally, the GSE source material 108 may be produced using a fermentation process or a precipitation process.

Exemplary characteristics of GSE source materials 108 are presented in Table 1, below. In general, a liquid form of the GSE source material can include a total amount of phenolics from about 6,000 ppm to about 350,000 ppm, a percent solids from about 0.6% to about 35%, a turbidity from about 3.3 NTU to about 32,400 NTU, a pH from about 2.0 to about 5.0, a total amount of catechin plus epicatechin from about 500 ppm to about 1500 ppm (or from about 5% to about 30% by weight, on a dry weight basis), and/or gallic acid from about 40 ppm to about 650 ppm (or from about 0.1% to about 8% by weight, on a dry weight basis).

TABLE 1

Example compositions for the GSE source material 108.

| GSE Source Material 108 | Total Phenolics | % Solids | Turbidity (NTU) | pH | Catechin + Epicatechin | Gallic Acid |
|---|---|---|---|---|---|---|
| Example A | 6,000-9,000 ppm (liquid) | 2.8 | 32,400 | 3.8-4.8 | 500-1500 ppm (liquid) | 40-400 ppm (liquid) |
| Example B | 3,000-9,000 ppm (liquid) | 0.6 | 3.3 | 2.0-3.0 | 500-1500 ppm (liquid) | 40-400 ppm |
| Example C | 10,000-20,000 ppm (liquid) | 1.3 | 27 | 3.2 | 1309 ppm | 650 ppm |
| Example D | 250,000-350,000 ppm (liquid) | 25-35 | <30 | 2.5-5.0 | 5-30% (dry weight) | 0.1-8% (dry weight) |
| Example E | 40-100% (dry weight) | | | | 5-30% (dry weight) | 0.1-8% (dry weight) | to hot water (e.g., from about 140° F. to about 225° F., at pressures at or above atmospheric, for about 1 to 6 h) to extract polyphenols or other compounds from the seeds. The extracted materials can be filtered from spent seeds using metal screens. The aqueous extract may be cooled and/or treated with a pectinase enzyme (e.g., PECTINEX ULTRA SP-L; Novozyme) to break down extraneous materials such as cell wall constituents (e.g., pectin). The resulting extract may optionally be acidified with an acid (e.g., a mineral acid, an organic acid, or a food-grade acid, such as acetic acid, sulfuric acid, or phosphoric acid) to lower the pH from about 4 (e.g., 3.5 to 4.5) to about 2 (e.g., 1.5 to 2.5). Additionally or alternatively, tannase (e.g. from Kikkoman Biochemifa), an esterase, can be added to the extract to degrade one or more tannins (e.g., galloylated proanthocyanidins, gallotannins, and/or ellagitannins) and/or improve the solubility. The tannase may cleave gallic acid from the one or more tannins. Solids may be removed with a centrifuge (e.g., at 9000 rpm), a decanter, and/or by passing the liquid (or supernatant) through a microfilter (e.g., a dead-end filter (e.g., a WHATMAN 11 micron #1 filter, or a sock filter), a pressure filter (e.g., plate filter), a vacuum filter (e.g., rotary drum), a centrifugal filter, a cross-flow tubular membrane, a spiral wound membrane, or a ceramic membrane), to produce the Still referring to FIG. 1, the GSE source material 108 can be provided to a filter 110, which can be used to produce a retentate 112 and a permeate 114. The filter 110 can be or include, for example, a membrane or an ultrafiltration filter, such as a spiral-wound membrane (e.g., 4.6 cm by 30.5 cm), a tubular membrane, and/or a ceramic membrane, where the liquid or filtrate can move tangentially with respect to the membrane (e.g., crossflow filtration). In some examples, the filter 110 can be incorporated into a high pressure, reverse osmosis system (e.g., an RO MINI, provided by TANGENT MEMBRANES, Inc.). The filter 110 can have a molecular weight cutoff from about 50,000 Daltons to about 250,000 Daltons, from about 80,000 Daltons to about 200,000 Daltons, or about 100,000 Daltons. In the illustrative embodiment, providing the GSE source material 108 to the filter 110 produces a retentate 112 and a permeate 114.

Other techniques can be used to produce the retentate 112 and the permeate 114 from the source material 108. For example, the retentate 112 and the permeate 114 can be produced using: dead-end filtration with a molecular weight cutoff, nanofiltration, liquid chromatography (e.g., reverse phase, normal phase, hydrophilic interaction, adsorption-elution, size-exclusion, etc.), counter-current chromatography, and/or supercritical fluid chromatography.

In general, the permeate 114 can include components having molecular weights below the molecular weight cutoff of the filter 110 (e.g., oligomers and monomers), and the retentate 112 can include components having molecular weights above the molecular weight cutoff of the filter 110 (e.g., polymers). For example, the filter 110 can prevent components having molecular weights above the cutoff from passing through the filter 110. In some embodiments, dia-filtration can be performed (e.g., with water) to assist with the formation of the permeate 114 and the retentate 112, for example, to help carry lower molecular weight components through the filter 110 and into the permeate 114.

The filtration process (e.g., including ultrafiltration, nano-filtration, and/or diafiltration) can be performed at a temperature from about 80° F. (26.7° C.) to about 110° F. (43.3° C.), or about 95° F. (35° C.), and at pressure from about 25 psi (0.17 MPa) to about 75 psi (0.52 MPa), or about 50 psi (0.34 MPa). The temperature and/or pressure can be varied, if desired, to achieve more or less passage of materials through the filter 110 and thus can be used to adjust a final product composition. In some embodiments, the retentate 112 can be thermally or non-thermally pasteurized using, for example, flash or high-temperature short-time pasteurization, higher heat shorter time, retort, high pressure processing, UV light, ultrasound, pulsed electric fields, a plate and frame heat exchanger, or refractance window drying.

The retentate 112 produced using the filter 110 can be dried or de-watered using a concentrator 116 and a dryer 118. In general, the concentrator 116 can evaporate liquid (e.g., water) from the retentate 112 to increase a percent solids, which can enable a more efficient throughput and can assist with a drying process in the dryer 118. The concentrator 116 can evaporate the liquid at low pressure and/or can utilize a variety of techniques, including, for example, thin film vacuum distillation with heat (e.g., performed using a BÜCHI ROTAVAPOR, such as R-220 SE, R-210, or R-215), blow down, distillation, falling film, flooded, spinning cone, centrifugal, spontaneous, wiped film, other concentration techniques, or any combination thereof. The evaporated liquid can be recovered and/or recycled. The retentate 112 can have a percent solids content after the concentrator 116 from about 25% to about 50%. In certain embodiments, the retentate 112 can have a percent solids content after the concentrator 116 from about 33% to about 42%.

After the concentrator 116, the retentate 112 can be dried in the dryer 118, which can utilize a variety of drying techniques, including, for example, refractance window drying (RWD, alternatively referred to as conductance window drying or CWD), drum drying, conveyor drying, spray drying, or freeze drying. In certain embodiments, RWD is preferred because it is gentle and/or does not damage the retentate 112. This is in large part due to lower temperatures and shorter drying times used to remove water, thus minimizing product damage (e.g., oxidation, color loss, etc.). RWD can involve, for example, spreading the retentate 112 on a moving belt (e.g., a PET belt) disposed over a heated water bath. Water is removed from the retentate 112 as the belt travels through the dryer. Flakes of the dried mixture are removed from the belt at the dryer exit. The flakes can have a large range of particle sizes, which can be homogenized or reduced through milling, grinding, sieving, or other techniques. RWD technology is described in U.S. Pat. No. 11,221,179, issued on Jan. 11, 2022, the entire disclosure of which is incorporated by reference herein. Alternatively, the use of spray drying can be disadvantageous because, for example, a higher ratio of water to solids may be needed to ensure proper atomization, different particle sizes or highbulk densities may not be achievable, and there can be high initial investment costs. Freeze drying 112 can be inefficient, energy intensive, and more expensive, compared to RWD. The dried material produced by the dryer 118 is the GSE composition 102, alternatively referred to herein as "GSE A." The GSE composition 102 produced by the methods and systems described herein can comprise characteristics not found in grape seed extracts known in the art. For example, said composition can include a mean degree of polymerization from about 4.1 to about 5.3; and phenols in an amount from about 61 to about 70 g GAE/100 g, on a dry basis. In specific embodiments, said composition can include a mean degree of polymerization from about 4.3 to about 4.9; and phenols in an amount from about 63 to about 69 g GAE/100 g, on a dry basis. In still further embodiments, said composition can include a mean degree of polymerization of approximately 4.6; and phenols in an amount of approximately 67 g GAE/100 g, on a dry basis. In some embodiments, the GSE composition 102 can comprise gallic acid in an amount of approximately 0 on a dry basis; a combination of catechin and epicatechin from about 0 to about 0.5 on a dry basis; an epicatechin gallate (ecg) terminal unit percentage from about 0 to about 16; or an epicatechin gallate (ecg) extension unit percentage from about 5.6 to about 15.6.

Still referring to FIG. 1, the permeate 114 can be provided to a filter 120, which can be used to produce a retentate 122 and a permeate 124. The filter 120 can be or include, for example, a membrane or an ultrafiltration filter (or a nano-filtration filter), such as a spiral membrane (e.g., 4.6 cm by 30.5 cm), a spiral-wound cross-flow membrane, a tubular membrane, and/or a ceramic membrane (e.g., incorporated in a high pressure, reverse osmosis system). The filter 120 can have a molecular weight cutoff from about 300 Daltons to about 10,000 Daltons, from about 800 Daltons to about 5,000 Daltons, or about 1,000 Daltons. In some examples, instead of using a molecular weight cutoff of about 1,000 Da, membranes with larger cutoffs (e.g., 5,000 to 10,000 Daltons) or smaller cutoffs (e.g., 300 to 800 Daltons) can be used, for example, to achieve enrichment of monomers (e.g., achieved with a smaller cutoff), monomers and dimers (DP=2), or monomers, dimers, and trimers (e.g., achieved with a larger cutoff). In the illustrative embodiment, providing the permeate 114 to the filter 120 produces a retentate 122 and a permeate 124.

Other techniques can be used to produce the retentate 122 and the permeate 124 from the permeate 114. For example, the retentate 122 and the permeate 124 can be produced using: dead-end filtration with a molecular weight cutoff, nanofiltration, liquid chromatography (e.g., reverse phase, normal phase, hydrophilic interaction, adsorption-elution, size-exclusion, etc.), counter-current chromatography, and/or supercritical fluid chromatography.

In general, the permeate 124 can include components having molecular weights below the molecular weight cutoff of the filter 120 (e.g., monomers), and the retentate 122 can include components having molecular weights above the molecular weight cutoff of the filter 120 (e.g., oligomers). For example, the filter 120 can prevent components having molecular weights above the cutoff from passing through the filter 120. In some embodiments, diafiltration can be performed (e.g., with water) to assist with the formation of the permeate 124 and the retentate 122, for example, to help carry lower molecular weight components through the filter 120 and into the permeate 124. Diafiltration can increase an amount of monomer and/or gallic acid in the permeate 124 and/or can increase an amount of oligomer in the retentate 122.

The filtration process (e.g., including ultrafiltration, nano-filtration, and/or diafiltration) can be performed at a temperature from about 80° F. (26.7° C.) to about 110° F. (43.3° C.), or about 95° F. (35° C.), and at pressure from about 25 psi (0.17 MPa) to about 75 psi (0.52 MPa), or about 50 psi (0.34 MPa). The temperature and/or pressure can be varied, if desired, to achieve more or less passage of materials through the filter 120 and thus can be used to adjust a final product composition. In some embodiments, the retentate 122 can be thermally or non-thermally pasteurized using, for example, flash or high-temperature short-time pasteurization, higher heat shorter time, retort, high pressure processing, high pressure homogenization, UV light, ultrasound, pulsed electric fields, a plate and frame heat exchanger, or refractance window drying.

The retentate 122 produced using the filter 120 can be dried or de-watered using a concentrator 126 and a dryer 128. In general, the concentrator 126 can evaporate liquid (e.g., water) from the retentate 122 to increase a percent solids, which can enable a more efficient throughput and can assist with a drying process in the dryer 128. The concentrator 126 can evaporate the liquid at low pressure and/or can utilize a variety of techniques, including, for example, vacuum distillation with heat, blow down, distillation, falling film, flooded, spinning cone, centrifugal, spontaneous, wiped film, other concentration techniques, or any combination thereof. The evaporated liquid can be recovered and/or recycled. The retentate 122 can have a percent solids content after the concentrator 126 from about 25% to about 50%. After the concentrator 126, the retentate 122 can be dried in the dryer 128, which can utilize a variety of drying techniques, including, for example, RWD, drum drying, conveyor drying, spray drying, or freeze drying. In some embodiments. RWD is preferred because it is gentle and/or does not damage the retentate 122, as described herein. The dried material produced by the dryer 128 is the GSE composition 104, alternatively referred to herein as "GSE B." The GSE composition 104 produced by the methods and systems described herein can comprise characteristics not found in grape seed extracts known in the art. For example, said composition can include a mean degree of polymerization from about 2.2 to about 2.7; and phenols in an amount from about 30 to about 60 g GAE/100 g, on a dry basis. In specific embodiments, said composition can include a mean degree of polymerization from about 2.3 to about 2.6; and phenols in an amount from about 40 to about 50 g GAE/100 g, on a dry basis. In still further embodiments, said composition can include a mean degree of polymerization of approximately 2.5; and phenols in an amount of approximately 40 g GAE/100 g, on a dry basis. In some embodiments, the GSE composition 104 can comprise gallic acid in an amount of about 0.3 to about 0.6 on a dry basis; a combination of catechin and epicatechin from about 0.3 to about 2.6 on a dry basis; an epicatechin gallate (ecg) terminal unit percentage from about 0 to about 14.4; or an epicatechin gallate (ecg) extension unit percentage from about 3.7 to about 11.5.

The permeate 124 can be dewatered (e.g., in a concentrator), if desired, and loaded into a purifier 130, which can be used to produce a purified liquid 132 having a higher concentration of condensed tannins, compared to the permeate 124. In some instances, the purifier 130 can be or include an adsorption-elution column (e.g., a glass, plastic, or metal column) containing a bed of resin particles for performing a fractionation process. The resin particles can be made of or include, for example, polyaromatic materials, divinylbenzene, polystyrene, methacrylate, acrylic ester, or other suitable materials. The resin particles may be functionalized with one or more moieties (e.g., cationic, anionic, bromine, etc.) or crosslinked to modify retention properties and final product composition. In some embodiments, the resin particles can include a macroporous resin that combines an aliphatic adsorbent resin structure with high surface area, such as XAD7HP resin (e.g., 300 mL BV) or FPX66 resin, available from DUPONT. As the permeate 124 passes through the column, condensed tannins can be adsorbed to the resin and more polar entities (e.g., anions, cations, sugars, organic acids, other impurities, etc.) can migrate past the resin and out of the column. The column can be washed with water to remove the polar entities. The purifier 130 can include any number of adsorption-elution columns (e.g., 1, 2, 4, 10, etc.) of any size.

Once the adsorption process is complete, the condensed tannins can be desorbed or eluted from the resin using a solvent, such as, for example, ethanol, methanol, propanol, iso-propanol, acetone, glycerol, glycol, ethyl acetate, and/or any solvent compatible with the resin or stationary phase. Such solvents may be used in any combination, with or without water, to effect selective desorption of certain chemistries. For example, ethanol (0-100%) can be used alone or in combination with water (0-100%) to selectively desorb the targeted chemistries described herein. The solvent used for desorption can be or include, for example, about 75% ethanol and about 25% water, by volume.

In some embodiments, the desorption process can utilize a step, linear, multilinear, or other gradient to vary a composition of the solvent and/or achieve a desired separation of chemistries. For example, in a step gradient fashion, 0-20% ethanol in water may be used to selectively desorb low molecular weight compounds (e.g., flavanol monomers, gallic acid, etc.). A solution of 20-50% ethanol in water can then be used to selectively desorb oligomers (e.g., tetramers, pentamers, etc.). Finally, a solution of 50-100% ethanol in water can be used to selectively desorb and elute oligomers and polymers. Other sequences of solvents or solvent concentrations can be used. In some instances, for example, a gradient elution may be employed where an ethanol concentration is increased and water concentration is simultaneously decreased (e.g., linearly), over time. Flowrates, solvent types, solvent concentrations, temperature, and/or time of exposure may be varied in any combination or sequence, to preferentially desorb and elute target or superfluous chemistries. A combination of step and gradient (e.g., linear gradient) may be employed.

Figure 2B:
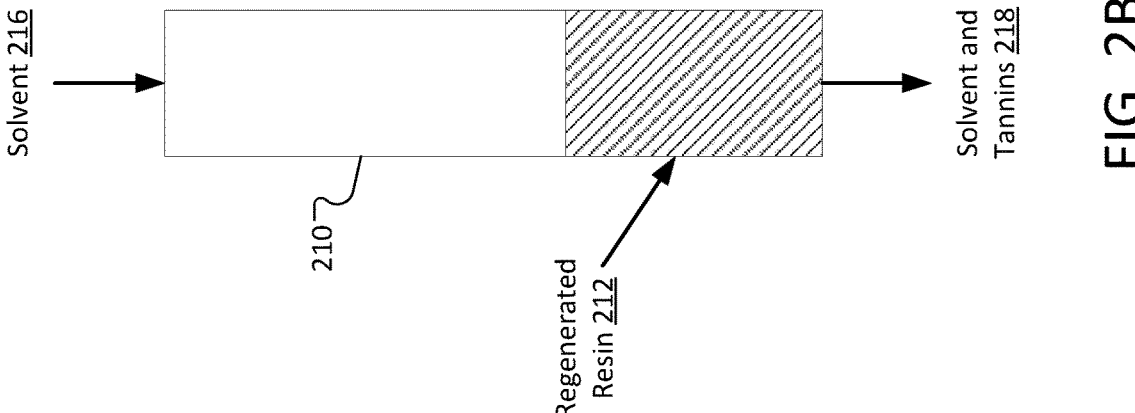
FIG. 2B is a schematic diagram of an adsorption-elution column being operated in a packed condition, in accordance with certain embodiments.
Figure 2A:
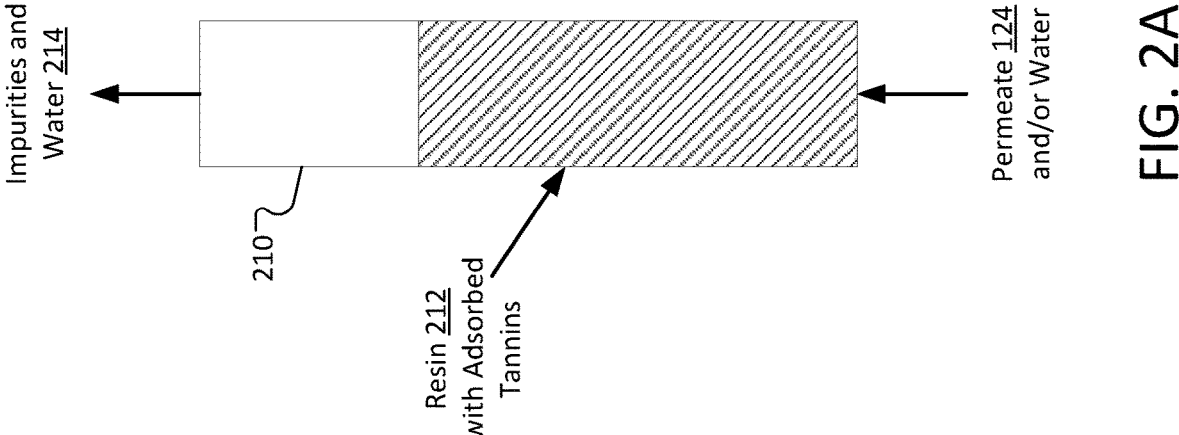
FIG. 2A is a schematic diagram of an adsorption-elution column being operated in a fluidized condition, in accordance with certain embodiments.

The adsorption-elution column can be operated in a packed or fluidized condition during the adsorption process and/or desorption process. In one illustrative embodiment, referring to FIG. 2A, an adsorption-elution column 210 can be operated in a fluidized condition during an adsorption process in which the permeate 124 is fed into the column 210 (or when the column is washed with water), tannins are adsorbed to a resin 212 in the column 210, and impurities and water 214 exit the column 210. The fluidized condition can be suitable when the permeate 124 includes particulates that could clog a column being operated in a packed condition (e.g., when the permeate 124 is cloudy or contains suspended particles). Additionally or alternatively, referring to FIG. 2B, the column 210 can be operated in a packed condition during a desorption process (or a resin regeneration process) in which a solvent 216 (e.g., ethanol) is passed through the resin 212 and the solvent and desorbed tannins 218 exit the column 210. In various embodiments, the adsorption and desorption processes can be performed using any number of columns 210, with each column 210 being operated in a packed condition and/or a fluidized condition.

Referring again to FIG. 1, in some embodiments, in addition to or instead of performing a fractioning process, the purifier 130 can utilize a variety of other techniques to purify the permeate 124. For example, membrane technologies such as nanofiltration, reverse-osmosis, or electrofiltration can be used in lieu of resin columns to purify target chemistries. Additionally or alternatively, chromatographic techniques can be utilized, such as flash, high-performance liquid, centrifugal partition, or counter-current. Such chromatographic techniques, however, can be expensive, have scaling limitations, utilize hazardous solvents, require specialized or experienced workers, or may not be environmentally friendly. In certain embodiments, the purifier 130 can utilize solvent-solvent partitioning, which can be performed in conjunction with counter-current techniques (e.g., centrifugal partition). Other possible techniques employed by the purifier 130 can include, for example, fermentation techniques (e.g., to convert trace fermentable sugars into carbon dioxide and ethanol), precipitation techniques (e.g., using polyamides, polyamines, aminopolysaccharides, aluminum chloride, or alkaloids as binding substances), and adsorptive bubble or foam fractionation. In some implementations, the purifier 130 (or a similar device) can be used to purify the retentate 112, the retentate 122, and/or the permeate 114 to enrich key chemistries (e.g., increase total phenols and/or a concentration of condensed tannins) in these materials.

In the illustrative embodiment shown in FIG. 1, providing the permeate 124 to the purifier 130 produces a purified liquid 132. The purified liquid 132 produced using the purifier 130 can be dried or de-watered using a concentrator 136 and a dryer 138. In general, the concentrator 136 can evaporate the solvent (e.g., ethanol) and/or other liquid (e.g., water) from the purified liquid 132 to increase a percent solids, which can enable a more efficient throughput and can assist with a drying process in the dryer 138. For example, the concentrator 136 can evaporate the solvent and water at low pressure and/or can utilize a variety of techniques, including, for example, vacuum distillation with heat, blow down, distillation, falling film, flooded, spinning cone, centrifugal, spontaneous, wiped film, other concentration techniques, or any combination thereof. The evaporated solvent (e.g., ethanol) can be recovered and/or recycled. The purified liquid 132 can have a percent solids content after the concentrator 136 from about 25% to about 50%.

After the concentrator 136, the purified liquid 132 can be dried in the dryer 138, which can utilize a variety of drying techniques, including, for example, RWD, spray drying, or freeze drying. In various embodiments, RWD is preferred because it is gentle and/or does not damage the purified liquid 132, as described herein. The dried material produced by the dryer 138 is the GSE composition 106, alternatively referred to herein as "GSE C." The GSE composition 106 produced by the methods and systems described herein can comprise characteristics not found in grape seed extracts known in the art. For example, said composition can include a mean degree of polymerization from about 1.2 to about 1.4; and phenols in an amount from about 80 to about 95 g GAE/100 g, on a dry basis. In specific embodiments, said composition can include a mean degree of polymerization of approximately 1.3; and phenols in an amount of approximately 93 g GAE/100 g, on a dry basis. In some embodiments, the GSE composition 106 can comprise gallic acid in an amount of about 0.4 to about 3.9 on a dry basis; a combination of catechin and epicatechin from about 20 to about 41 on a dry basis; an epicatechin gallate (ecg) terminal unit percentage from about 0.9 to about 9.1; or an epicatechin gallate (ecg) extension unit percentage from about 1.4 to about 7.8.

In some embodiments, the system 100 may not utilize three dryers and/or three concentrators. For example, one dryer or two dryers can be used for the dryer 118, the dryer 128, and the dryer 138, such that two or all three of these dryers can be the same. Likewise, one concentrator or two concentrators can be used for the concentrator 116, the concentrator 126, and the concentrator 136, such that two or all three of these concentrators can be the same. In various embodiments, the system 100 or any component thereof can be operated in a continuous manner (e.g., a continuous process) or a discontinuous manner (e.g., a batch process).

In certain embodiments, the GSE compositions 102, 104, and 106 can be milled to achieve desired particle sizes or particle size distributions (e.g., to form a powder). For example, milling can be performed to achieve no more than 2% retained by a 40 mesh.

Figure 3:
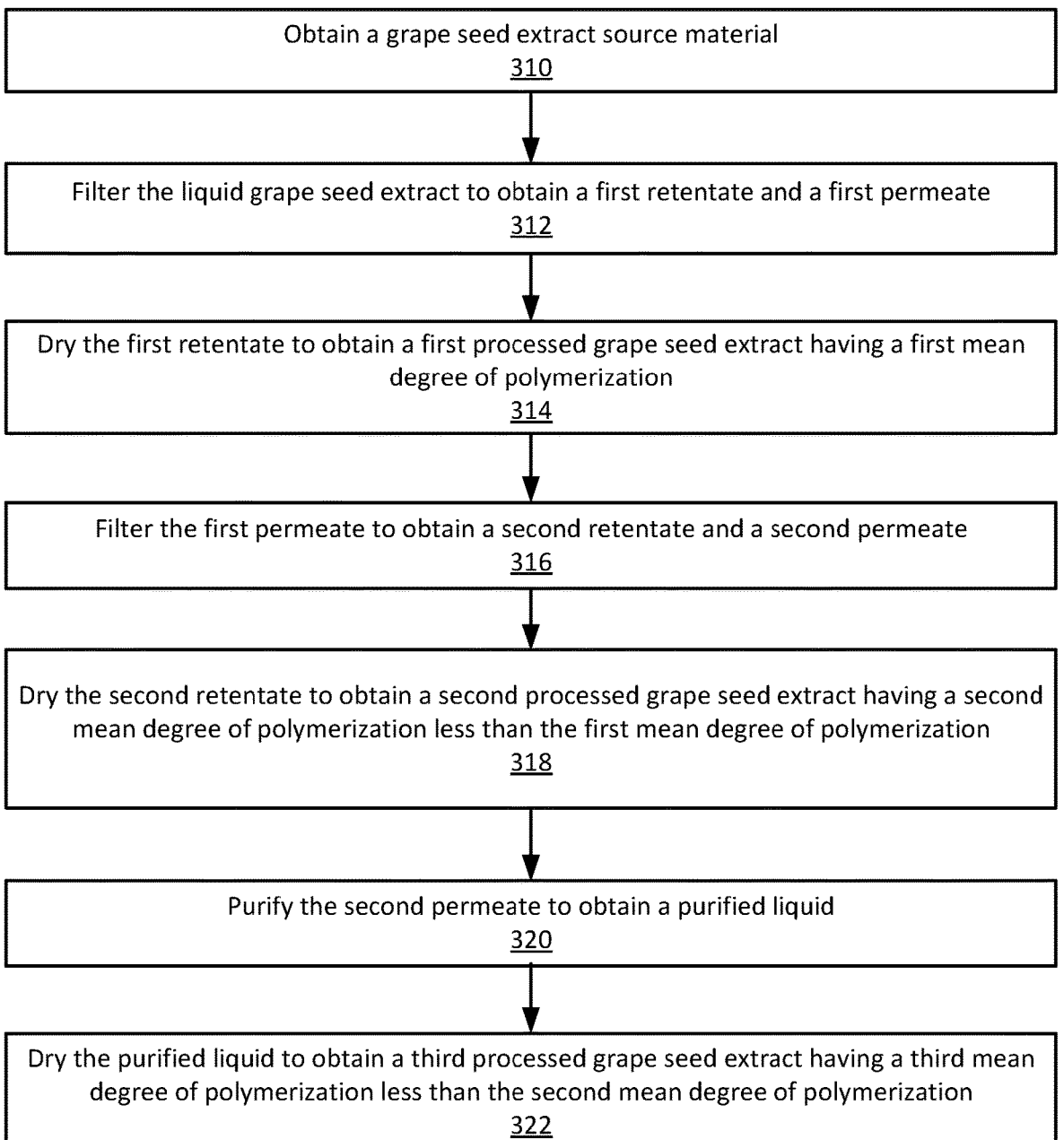
FIG. 3 is a flowchart of a method of processing a grape seed extract, in accordance with certain embodiments.

FIG. 3 is a flowchart of an exemplary method of processing a grape seed extract (e.g., using the system 100), in accordance with embodiments described herein. In method 300, a liquid grape seed extract is obtained (step 310) and filtered (step 312) to obtain a first retentate and a first permeate. The first retentate is dried (step 314) to obtain a first processed grape seed extract (e.g., GSE A) having a first mean degree of polymerization. The first permeate is filtered (step 316) to obtain a second retentate and a second permeate. The second retentate is dried (step 318) to obtain a second processed grape seed extract (e.g., GSE B) having a second mean degree of polymerization less than the first mean degree of polymerization. The second permeate is purified (step 320) to obtain a purified liquid. The purified liquid is dried (step 322) to obtain a third processed grape seed extract (e.g., GSE C) having a third mean degree of polymerization less than the second mean degree of polymerization.

Referring again to FIG. 1, in various embodiments, the system 100 and related methods described herein can utilize a sequence of filters 110 and 120 and the purifier 130 to separate the GSE source material 108 into the three GSE compositions 102, 104, and 106 (GSE A, GSE B, and GSE C, respectively). The chemistry and respective concentrations in these compositions 102, 104, and 106 can depend on how the GSE source material 108 was produced. In some embodiments, for example, the GSE source material 108 can be produced with or without tannase and with or without acid adjustment, such that there can be four different permutations for the GSE source material 108 (e.g., with tannase and with acid adjustment; with tannase and without acid adjustment; without tannase and with acid adjustment; and without tannase and without acid adjustment). These four permutations can result in four permutations for each of the three GSE compositions 102, 104, and 106.

For example, Tables 2 and 3 present experimental measurements of various parameters associated with the GSE compositions 102, 104, and 106 (GSE A, GSE B, and GSE C, respectively). Table 2 includes values for the compositions 102, 104, and 106 obtained when the GSE source material 108 was acidified (e.g., pH was about 2.2 to 2.4), with and without the use of tannase. Table 3 includes values for the compositions 102, 104, and 106 obtained when the GSE source material 108 was non-acidified (e.g., pH was about 4.1 to 4.3), with and without the use of tannase.

TABLE 2

Parameters for compositions 102, 104, and 106 (GSE A, B, and C, respectively) obtained when the GSE source material 108 was acidified to about 2.3, with and without the use of tannase.

| Parameter | Without Tannase | | | With Tannase | | |
|---|---|---|---|---|---|---|
| | GSE A | GSE B | GSE C | GSE A | GSE B | GSE C |
| Total Phenols (g GAE/100 g), Dry Basis | 70% | 30% | 90% | 61% | 49% | 94% |
| wt % Gallic Acid, Dry Basis | ND | 0.4 | 3.9 | ND | 0.5 | 2.1 |
| wt % Total Catechin + Epicatechin, Dry Basis | 0.4 | 0.3 | 36.5 | 0.5 | 0.6 | 29 |
| % epicatechin gallate (ecg) terminal units | 16 | 11.3 | 5.5 | 0 | 0 | 0.9 |
| % epicatechin gallate (ecg) extension units | 14.2 | 9.6 | 5.3 | 5.6 | 3.7 | 1.4 |
| Mean Degree of Polymerization (mDP) | 4.3 | 2.2 | 1.2 | 4.1 | 2.6 | 1.4 |
| Water Activity (at about 22° C.) | 0.247 | 0.176 | 0.199 | 0.221 | 0.356 | 0.282 |
| % Moisture | 5.7 | 3.4 | 3.9 | 5.5 | 3.1 | 3.1 |
| pH of 1% Solution of Composition in Water | 3.1 | 2.3 | 3.1 | 3.1 | 2.4 | 3.3 |
| % Yield of Total | 54 | 34 | 12 | 38 | 43 | 19 |

TABLE 3

Parameters for compositions 102, 104, and 106 (GSE A, B, and C, respectively) obtained when the GSE source material 108 was non-acidified (pH of about 4.2), with and without the use of tannase.

| Parameter | Without Tannase | | | With Tannase | | |
|---|---|---|---|---|---|---|
| | GSE A | GSE B | GSE C | GSE A | GSE B | GSE C |
| Total Phenols (g GAE/100 g), Dry Basis | 67% | 47% | 93% | 70% | 34% | 95% |
| wt % Gallic Acid, Dry Basis | ND | 0.3 | 0.4 | ND | 0.6 | 1 |
| wt % Total Catechin + Epicatechin, Dry Basis | 0.3 | 1.6 | 33.5 | 0.3 | 2.6 | 41 |
| % epicatechin gallate (ecg) terminal units | 15.9 | 14.4 | 9.1 | 7.2 | 4.2 | 2 |
| % epicatechin gallate (ecg) extension units | 15.6 | 11.5 | 7.8 | 10.3 | 4.8 | 2.1 |
| Mean Degree of Polymerization (mDP) | 5.3 | 2.7 | 1.4 | 4.8 | 2.3 | 1.3 |
| Water Activity (at about 22° C.) | 0.389 | 0.296 | 0.274 | 0.245 | 0.257 | 0.246 |
| % Moisture | 8.69 | 2.72 | 3.28 | 5.43 | 3.5 | 2.99 |
| pH @ 1% | 3.99 | 3.91 | 4.19 | 3.78 | 4.06 | 4.04 |
| % Yield of Total | 57 | 29 | 14 | 58 | 30 | 12 |

As the experimental results in Tables 2 and 3 indicate, in general, the amount of total phenols (e.g., in grams of gallic acid equivalent (GAE) per 100 grams, dry basis) was highest in GSE C (from about 80% to about 99%), followed by GSE A (from about 50% to about 70%) and GSE B (from about 20% to about 60%). The results also indicate that, in general, the amount of gallic acid (e.g., in percent by weight, dry basis) was highest in GSE C (from about 1% to about 15%), followed by GSE B (from about 0% to about 5%) and GSE A (about 0% or not detected). The results also indicate that, in general, the amount of catechin plus epicatechin (e.g., in percent by weight, dry basis) was highest in GSE C (from about 10% to about 75%), followed by GSE B (from about 0.1% to about 5%) and GSE A (from about 0.1% to about 5%). The results in Tables 2 and 3 further indicate that tannase treated GSE compositions generally exhibit lower levels of epicatechin gallate (ecg) terminal units (from about 0% to about 2%) and epicatechin gallate (ecg) extension units (from about 0% to about 8%), compared to GSE compositions prepared without tannase. The results also indicate that tannase treated GSE compositions generally exhibit lower degree of galloylation (gallic acid esterification), as indicated by the amounts of epicatechin gallate terminal units and epicatechin gallate extension units, compared to GSE compositions prepared without tannase. The composition having the highest total epicatechin level was GSE C produced with tannase and a pH of about 4.2 (non-acidified). Otherwise, the compositions were not significantly influenced by pH adjustments.

For comparison, Table 4 presents experimental measurements of parameters associated with control compositions produced without using the filtration steps (e.g., at filters 110 and 120) and the purification step (e.g., at purifier 130). In this case, the four variations of GSE source material 108 used to generate the GSE compositions 102, 104, and 106 (i.e., with and without acidification and with and without tannase) were concentrated and dried (e.g., using the concentrator 116 and dryer 118, respectively).

TABLE 4

Parameters for control compositions produced from
GSE source material 108 with and without acidification
and with and without the use of tannase.

| | Without Tannase | | With Tannase | |
|---|---|---|---|---|
| Parameter | With Acid | No Acid | With Acid | No Acid |
| Starting Liquid Extract pH | ~2 | ~4 | ~2 | ~4 |
| Total Phenols (g GAE/100 g), Dry Basis | 88% | 90% | 86% | 89% |
| wt % Gallic Acid, Dry Basis | 1.2 | 1.1 | 4.8 | 2.8 |
| wt % Total Catechin + Epicatechin, Dry Basis | 7.4 | 7 | 7.7 | 7.1 |
| % epicatechin gallate (ecg) terminal units | 10.9 | 11.1 | 0.7 | 4.1 |
| % epicatechin gallate (ecg) extension units | 11.2 | 11.2 | 3 | 8 |
| mDP | 2.7 | 2.6 | 2 | 2.7 |
| Water Activity | 0.21 | 0.26 | 0.22 | 0.24 |
| % Moisture | 5.3 | 5.39 | 4 | 4.61 |

Figure 4A:
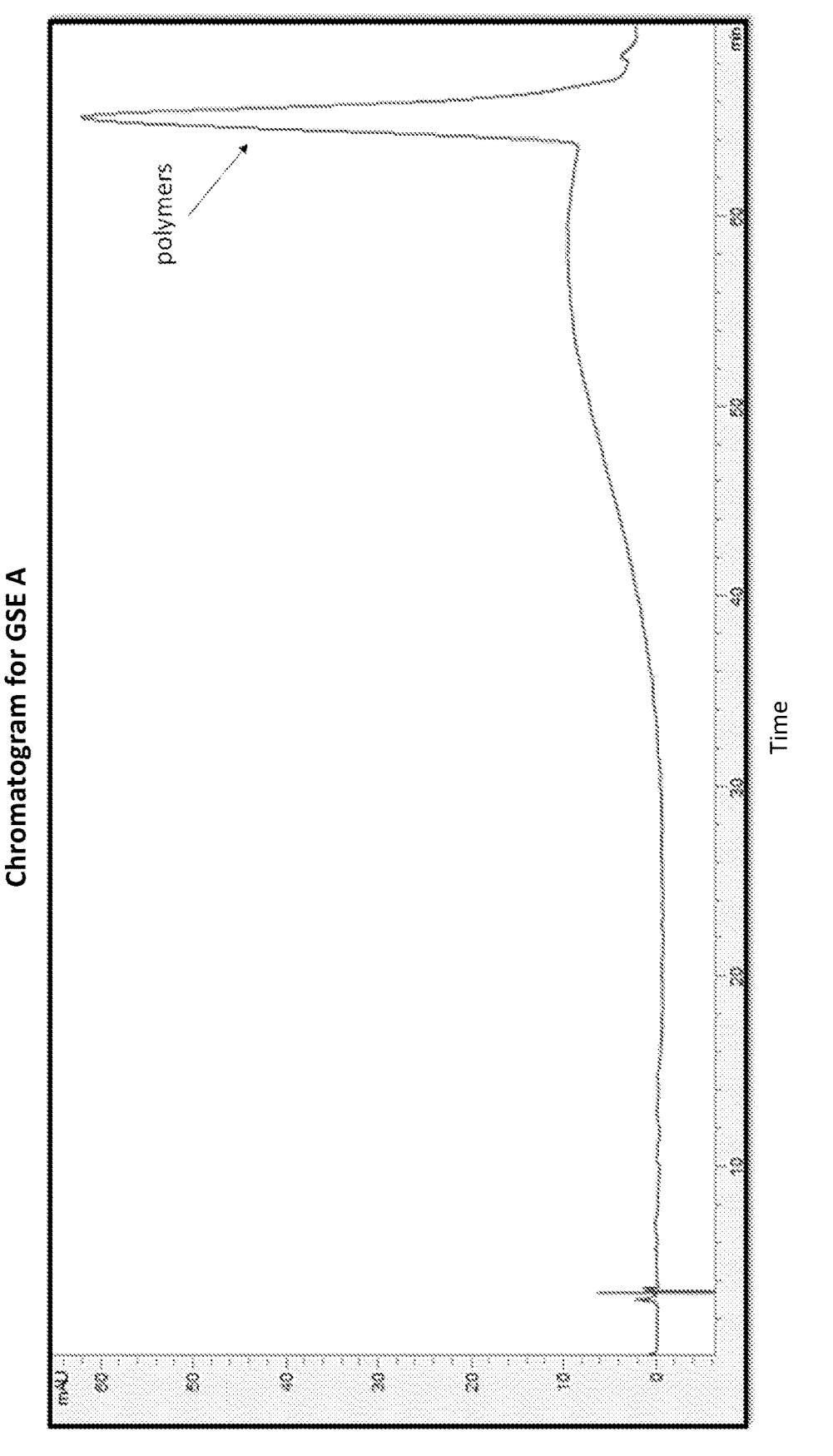
FIGS. 4A-4C are chromatograms for three respective grape seed extracts, GSE A (FIG. 4A), GSE B (FIG. 4B), and GSE C (FIG. 4C), obtained using hydrophilic interaction liquid chromatography (HILIC) with a diode-array detector (DAD), at 280 nm.
Figure 4B:
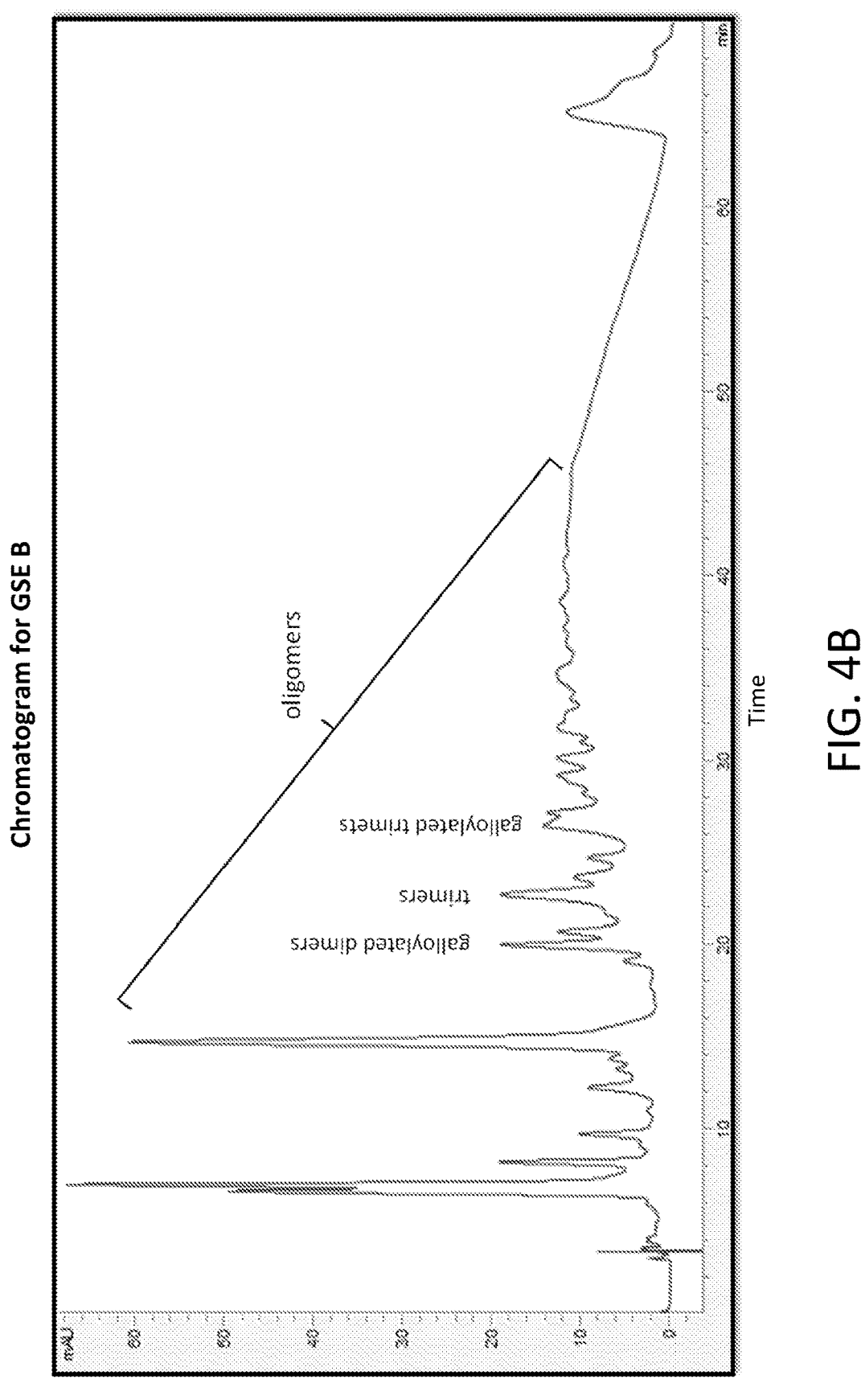
Figure 4C:
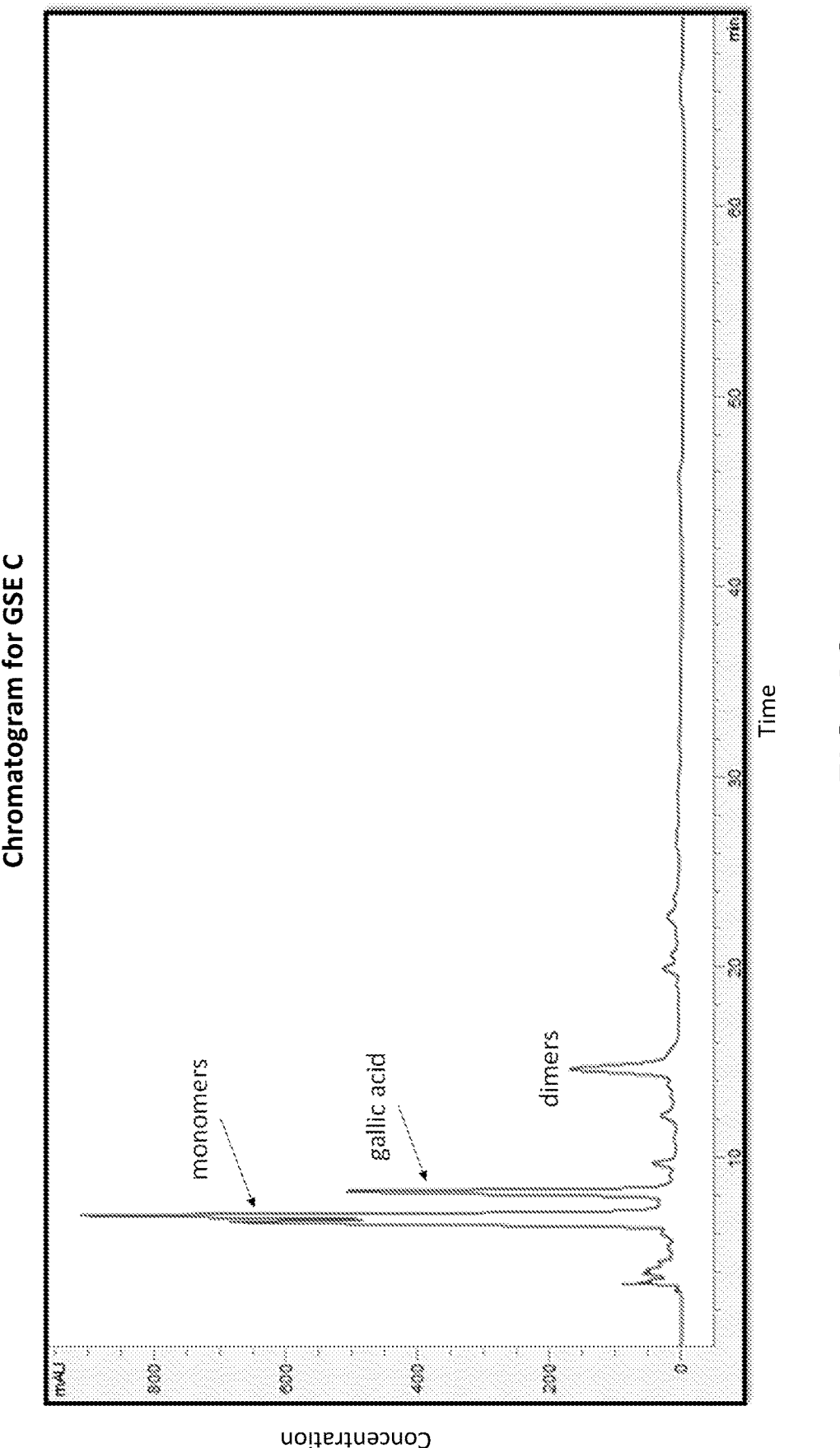

FIGS. 4A, 4B, and 4C depict chromatograms for exemplary GSE A, GSE B, and GSE C compositions, respectively, obtained using hydrophilic interaction liquid chromatography (HILIC) with a diol HPLC column (250×4.6 mm, 5 μm particle size) and a diode-array detector (DAD) at 280 nm, in accordance with certain embodiments described herein. Hydrophilic interaction liquid chromatography (HILIC) is an alternative high-performance liquid chromatography (HPLC) mode for separating polar compounds. The chromatograms include peaks corresponding to respective components in each composition, with peaks for lower molecular weight components (e.g., monomers) appearing closer to a left-hand side of the x-axis and higher molecular weight components (e.g., polymers) appearing closer to a right-hand side of the x-axis. An area of each peak indicates a concentration or amount of the respective component that is present in the composition. Various components (e.g., "polymers," "oligomers," and "monomers") that may be present in the compositions are labeled. As the figures indicate, GSE A in this example has a larger amount of polymers compared to GSE B and GSE C. GSE C in this example has larger amounts of monomers, gallic acid, and dimers, compared to GSE A and GSE B.

Tables 5 and 6 present experimental measurements of the relative amounts of monomers (e.g., monomeric flavanols, such as catechin and epicatechin, gallic acid), oligomers (e.g., oligomeric flavanols such as proanthocyanidins), and polymers (e.g., polymeric flavanols, such as proanthocyanidins) present in the GSE compositions 102, 104, and 106. The measurements were obtained using using hydrophilic interaction liquid chromatography (HILIC) with a diol HPLC column (250×4.6 mm, 5 μm particle size) and a diode-array detector (DAD) at 280 nm. Table 5 includes values for percentage of peak area in the HPLC measurements, for compositions 102, 104, and 106 (GSE A, B, and C, respectively) obtained when the GSE source material 108 was acidified (pH of about 2), with and without the use of tannase. Table 6 includes values for percentage of peak area in the HPLC measurements obtained when the GSE source material 108 was non-acidified (pH of about 4), with and without the use of tannase. In various embodiments, the values for percentage of peak area described herein may correspond to or be equal to weight percentages (wt %), on a dry basis.

TABLE 5

Example percentages of components for compositions 102,
104, and 106 (GSE A, B, and C, respectively) obtained
when the GSE source material 108 was acidified (pH
of about 2), with and without the use of tannase.

| | Without Tannase | | | With Tannase | | |
|---|---|---|---|---|---|---|
| Component | GSE A | GSE B | GSE C | GSE A | GSE B | GSE C |
| Monomers | 1.4 | 2.3 | 44.1 | 2.1 | 7.9 | 37.3 |
| Gallic Acid | 0 | 7.3 | 20.6 | 0 | 9.8 | 11.8 |
| Oligomers | 38.8 | 15.5 | 33.6 | 9.9 | 35.1 | 48.6 |
| Polymers | 59.8 | 74.9 | 1.7 | 88 | 47.2 | 2.3 |

TABLE 6

Example percentages of components for compositions 102,
104, and 106 (GSE A, B, and C, respectively) obtained
when the GSE source material 108 was non-acidified (pH
of about 4), with and without the use of tannase.

| | Without Tannase | | | With Tannase | | |
|---|---|---|---|---|---|---|
| Component | GSE A | GSE B | GSE C | GSE A | GSE B | GSE C |
| Monomers | 0.3 | 7.2 | 46.5 | 0.8 | 7.2 | 49.9 |
| Gallic Acid | 1 | 1.2 | 0.8 | 7.6 | 1.8 | 5.2 |
| Oligomers | 17.6 | 80.4 | 51.5 | 31.6 | 79.8 | 27.1 |
| Polymers | 81.1 | 11.2 | 1.2 | 60 | 11.2 | 17.8 |

As the results in Tables 5 and 6 indicate, in general and relative to one another, GSE A can have a highest percentage of polymers and lowest levels of monomers, GSE B can have a highest percentage of oligomers relative to other chemistries, and GSE C can have a highest percentage of monomers and gallic acid and lowest levels of polymers. The results also show that compositions produced using tannase can have higher levels of gallic acid, compared to compositions produced without using tannase.

Table 7 includes low, high, and typical values for various parameters associated with the compositions 102, 104, and 106 produced using the systems and methods described herein, in accordance with certain embodiments. The listed parameters can encompass possible ranges for the parameters that can be obtained depending on whether or not the GSE source material was prepared using tannase or acidification, as described herein. Each listed value can be a minimum, maximum, or average value (e.g., in a range of values). Various embodiments include any parameter value (e.g., integer or decimal value) within the cited ranges. For example, the total phenols value for GSE A can be greater than, less than, or equal to 61, 62, 63, . . . , or 70 g GAE/100 g. Express support and written description of these values for each parameter are hereby represented.

TABLE 7

Exemplary parameters for compositions 102, 104,
and 106 (GSE A, B, and C, respectively).

| Feature | GSE A | | | GSE B | | | GSE C | | |
|---|---|---|---|---|---|---|---|---|---|
| | Low | High | Typical | Low | High | Typical | Low | High | Typical |
| Total Phenols (g GAE/100g), Dry Basis | 61 | 70 | 67 | 30 | 60 | 40 | 80 | 95 | 93 |
| wt % Gallic Acid, Dry Basis | 0 | 0 | 0 | 0.3 | 0.6 | 0.45 | 0.4 | 3.9 | 1.9 |
| wt % Total Catechin + Epicatechin, Dry Basis | 0 | 0.5 | 0.4 | 0.3 | 2.6 | 1.3 | 20 | 41 | 35 |
| % Epicatechin Gallate (ecg) Terminal Units | 0 | 16 | 9.8 | 0 | 14.4 | 7.5 | 0.9 | 9.1 | 4.4 |
| % Epicatechin Gallate (ecg) Extension Units | 5.6 | 15.6 | 11.4 | 3.7 | 11.5 | 7.4 | 1.4 | 7.8 | 4.2 |
| mDP | 4.1 | 5.3 | 4.6 | 2.2 | 2.7 | 2.5 | 1.2 | 1.4 | 1.3 |
| Monomers (% of HPLC peak area) | 0.3 | 2.1 | 1.2 | 2.3 | 7.9 | 6.2 | 37.3 | 49.9 | 44.5 |
| Oligomers (% of HPLC peak area) | 9.9 | 38.8 | 24.5 | 15.5 | 80.4 | 52.7 | 27.1 | 51.5 | 40.2 |
| Polymers (% of HPLC peak area) | 59.8 | 88.0 | 72.2 | 11.2 | 74.9 | 36.1 | 1.2 | 17.8 | 5.8 |
| Water Activity | 0.22 | 0.39 | 0.28 | 0.18 | 0.36 | 0.27 | 0.20 | 0.28 | 0.25 |
| % Moisture | 5.43 | 8.69 | 6.3 | 2.72 | 3.5 | 3.2 | 2.99 | 3.9 | 3.3 |
| pH @ 1% | 3.1 | 3.99 | 3.5 | 2.3 | 4.06 | 3.2 | 3.1 | 4.19 | 3.7 |
| % Yield of Total | 38 | 58 | 51.7 | 29 | 43 | 34.0 | 12 | 19 | 14.3 |

In various embodiments, the compositions 102, 104, and 106 (GSE A, B, and C, respectively) can be soluble (or substantially soluble) in water (e.g., distilled water) and/or ethanol (e.g., pure ethanol or 95% ABV). For example, any of the compositions 102, 104, and 106 can have a solubility in water or ethanol from about 0.001 g/mL to about 0.1 g/mL at room temperature.

The compositions 102, 104, and 106 (GSE A, B, and C, respectively) can have a wide variety of applications. For example, the compositions 102, 104, and 106 can be used as additives for food, beverages, confectionary, winemaking, cidermaking, brewing, spirits, food and beverage antioxidant supplements, food and beverage preservation, functional food and beverages, flavoring, confectionary, chocolate, dietary supplements, cosmetics, nutraceuticals, or medicinal applications. The compositions 102, 104, and 106 may be used as metal chelators and/or for removal of nitrogenous compounds, leather tanning, or functionalizing resins or membranes. In various implementations, the compositions 102, 104, and 106 can be used as additives in wine (e.g., Chardonnay or Pinot Noir), to improve taste or sensory perception. The monomers present in GSE C (e.g., catechin and/or epicatechin) can have a bitter flavor, compared to GSE A and GSE B, while GSE A and GSE B can be more astringent, compared to GSE C. Additionally or alternatively, the degree of galloylation can influence astringency and bitterness. For example, GSE B (or other composition) produced using tannase may have a lower degree of galloylation and less astringency, compared to GSE B produced without tannase, and may produce a less harsh but softer mouthfeel. Thus, the compositions described herein can serve as additives for wines (and other products), to effectively adjust bitterness or astringency and/or to produce wines that are well-rounded or have improved mouthfeel, structure, weight, viscosity, and/or body.

The terms, "effective", "efficacious" or variations thereof are also terms interchangeably utilized in this application to describe the effects of grape seed compositions of the present invention when used as additives. In certain embodiments, such terms describe, for example, an increase or decrease in bitterness, an increase or decrease in astringency, an increase or decrease in viscosity, as compared to an appropriate control lacking said additive. In some embodiments, an effective amount of the GSE composition 102, 104, and 106 can comprise adding from about 50 ppm to about 500 ppm of the GSE composition. In other embodiments, an effective amount of the GSE composition 102 can comprise adding from about 50 ppm to about 500 ppm of the GSE composition. As such, in some embodiments the present disclosure provides methods of altering (e.g. increasing or decreasing) the bitterness, astringency, taste, structure weight, viscosity, or other characteristic by adding an effective amount of a GSE composition disclosed herein.

Additionally or alternatively, the compositions possess various biological activities (e.g., antioxidant, anti-inflammatory, and/or blood pressure lowering effects) and can provide a variety of health benefits. For example, the high oligomer content of GSE B can be beneficial for blood pressure, cardiovascular health, and/or antimicrobial or virucidal activity. The high polymer content in GSE A has demonstrated virucidal/antiviral characteristics. The high monomer content in GSE C can have a positive impact on human vascular health. One or more of the compositions can have a positive pre- and pro-biotic impact on gut health, which has implications for maladies associated with metabolic syndrome and cognitive health.

The compositions 102, 104, and 106 (GSE A, B, and C, respectively) can provide beneficial effects based on their unique characteristics (e.g. Total Phenols (g GAE/100 g), Dry Basis, wt % Gallic Acid, Dry Basis, wt % Total Catechin+Epicatechin, Dry Basis, % Epicatechin Gallate (ecg) Terminal Units, % Epicatechin Gallate (ecg) Extension Units, or mDP). Other grape seed extract compositions known in the art do not comprise such characteristics or provide the technical benefits described herein.

Figure 5:
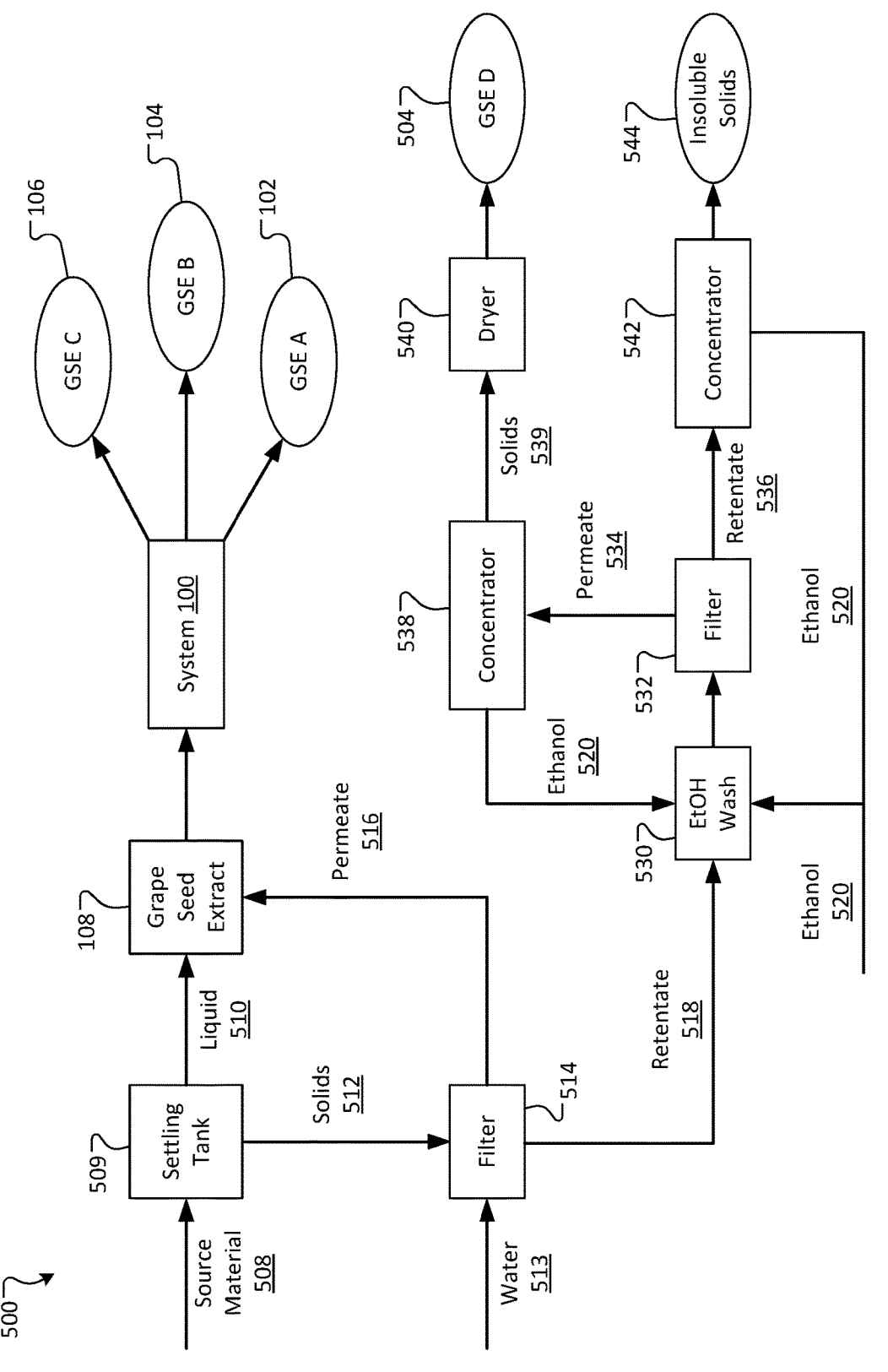
FIG. 5 is a block diagram of a system for producing grape seed extracts, in accordance with certain embodiments, in accordance with certain examples.

The present disclosure also provides a method and a system for processing a grape seed extract comprising: obtaining a mixture including a water-insoluble grape seed extract source material; adding ethanol to the mixture to form an ethanolic solution; filtering the ethanolic solution to obtain a permeate including ethanol and at least a portion of the water-insoluble grape seed extract source material dissolved in ethanol; and removing ethanol from the permeate to obtain a dried grape seed extract that is soluble in ethanol and insoluble in water. For example. FIG. 5 depicts a block diagram of a system 500 for producing a grape seed extract (GSE) composition 504 from a GSE source material 508, in accordance with examples described herein. The GSE source material 508 can be derived from grape seeds using a hot water extraction process (e.g., as described above for GSE source material 108), which may or may not utilize tannase and/or acidification, as described herein. The GSE source material 508 can be provided to a settling tank 509 and optionally chilled, to produce a liquid portion 510 (e.g., a water-soluble portion) and a solid portion 512 (e.g., a water-insoluble portion, including tank bottoms or heavy solids, with water-insoluble tannins). The liquid portion 510 can be the same as or can be used to produce the GSE source material 108, which can be used in the system 100 to produce GSE compositions 102, 104, and 106 (GSE A, B, and C, respectively), as described above.

In some embodiments, the solid portion 512 can be mixed with water 513, resuspended (e.g., with mixing), and separated using a filter 514 or other separation device to produce a permeate 516 and a retentate 518. The permeate 516 can be combined with the liquid portion 510 and/or used to produce the GSE source material 108. The filter 514 can be or include, for example, a dead-end filter (e.g., sock filter; 1-100 μm) membrane or an ultrafiltration filter, such as a spiral-wound membrane (e.g., 4.6 cm by 30.5 cm), a tubular membrane, and/or a ceramic membrane, where the liquid or filtrate can move tangentially with respect to the membrane (e.g., crossflow filtration). In some embodiments, the filter 514 can be incorporated into a high pressure, reverse osmosis system (e.g., an RO MINI, provided by TANGENT MEMBRANES, Inc.). The filter 514 can have a molecular weight cutoff from about 500,000 Daltons to about 700,000 Daltons, or about 600,000 Daltons. In certain embodiments, diafiltration can be performed (e.g., with water) to assist with the formation of the permeate 516 and the retentate 518, for example, to help carry lower molecular weight components through the filter 514 and into the permeate 516, and/or to concentrate or modify chemistries characteristic of the permeate 516 and retentate 518.

The retentate 518 can include water-insoluble solids and can be provided to an ethanol wash device 530 where the retentate 518 can be mixed with ethanol 520 or other suitable solvent. The wash device 530 can dissolve one or more components of the retentate 518 in the ethanol 520, which can be or include a mixture of ethanol and water and/or can have an ethanol concentration greater than about 90% ABV (e.g., about 95% ABV or 190 proof). To facilitate dissolution, the retentate 518 can be mixed with the ethanol 520 using a mixing device, such as a mixing blade or a homogenizer (e.g., an immersion homogenizer operated at 2500 rpm).

The resulting mixture of the retentate 518 and ethanol 520 is provided to a filter 532, which is used to produce an ethanol-soluble permeate 534 and an ethanol-insoluble retentate 536. The filter 532 can be or include a coarse filter (e.g., WHATMAN #1 filter paper), a filter sock, an ultrafiltration filter, and/or a centrifuge. In some embodiments, the filter 532 can have a pore size of about 0.4 microns and/or a molecular weight cutoff from about 150,000 Daltons to about 250,000 Daltons, or about 200,000 Daltons. The filter 532 can be resistant to degradation by ethanol (e.g., ethanol compatible). In certain embodiments, diafiltration can be performed (e.g., with ethanol or water) to assist with the formation of the permeate 534 and the retentate 536, for example, to help carry ethanol 520 or lower molecular weight components through the filter 532 and into the permeate 534, and/or to concentrate or modify chemistries characteristic of the permeate 534 and retentate 536.

The permeate 534 can be provided to a concentrator 538 where ethanol 520 can be removed from ethanol-soluble solids 539 (e.g., ethanol-soluble tannins) in the permeate 534. The concentrator 538 can utilize a variety of separation techniques. For example, the concentrator 538 can evaporate the ethanol 520 at low pressure and/or can utilize a variety of techniques, including, for example, vacuum distillation with heat, blow down, distillation, falling film, flooded, spinning cone, centrifugal, spontaneous, wiped film, other concentration techniques, or any combination thereof. Alternatively or additionally, the concentrator 538 can precipitate the ethanol-soluble solids 539 from the ethanolic solution by adding water (with or without chilling) followed by filtration (e.g., dead-end filtration) or centrifugation, as described herein. The ethanol 520 may be recovered, for example, by condensing ethanol vapor back to a liquid form (e.g., in a distillation process). The recovered ethanol 520 may be recycled and used in the ethanol wash device 530. The solids 539 after the concentrator 538 can have a percent solids content from about 25% to about 50%.

After the concentrator 538, the solids 539 can be dried in a dryer 540, which can utilize a variety of drying techniques, including, for example, RWD, spray drying, or freeze drying. In various embodiments, RWD is preferred because it is gentle and/or does not damage the solids 539, as described herein. The dried material produced by the dryer 540 is the GSE composition 504, alternatively referred to herein as "GSE D." GSE D may be or include highly polymeric condensed tannins and/or may be largely devoid of monomers, oligomeric, and other low molecular weight compounds (e.g., gallic acid). GSE D may be soluble (or substantially soluble) in ethanol but insoluble (or substantially insoluble) in water. For example, GSE D may have a solubility in ethanol (e.g., pure ethanol or about 95% ABV) from about 0.001 g/mL to about 0.1 g/mL, at room temperature. By comparison, the solubility of GSE D in water (e.g., distilled water) may be less than about 0.0001 g/mL, less than about 0.00001 g/mL, or zero, at room temperature.

The retentate 536 produced by the filter 532 can be provided to a concentrator 542, which can evaporate ethanol 520 and/or other liquids (e.g., water) from the retentate 536. For example, the concentrator 542 can evaporate the ethanol at low pressure and/or can utilize a variety of techniques, including, for example, vacuum distillation with heat, blow down, distillation, falling film, flooded, spinning cone, centrifugal, spontaneous, wiped film, other concentration techniques, or any combination thereof. Additionally or alternatively, the concentrator 542 can utilize or include a dryer, which can use a variety of drying techniques, including, for example, RWD, spray drying, or freeze drying. The ethanol 520 can be recovered (e.g., by distillation or condensation) and recycled for use in the ethanol wash device 530. The concentrator 542 can output a solid material 544 that is insoluble (or substantially insoluble) in water and ethanol. The solid material 544 may be soluble (or substantially soluble) in dimethyl sulfoxide (DMSO), sulfuric acid (e.g., 10 mg/mL), sodium hydroxide (e.g., 10 mg/mL), or other solvents.

In various embodiments, the system 500 or any component thereof can be operated in a continuous manner (e.g., a continuous process) or a discontinuous manner (e.g., a batch process). Additionally or alternatively, equipment used in the system 500 can be explosion-proof and/or leak-proof to ensure safe handling of ethanol or other volatile or flammable materials. In certain implementations, a purifier (e.g., the purifier 130 or similar device) can be used to further process the permeate 516, the retentate 518, and/or the permeate 534, for example, to enrich key chemistries (e.g., increase total phenols and/or a concentration of condensed tannins) in these materials.

FIG. 6 is a flowchart of an example method 600 of processing a grape seed extract (e.g., using the system 500), in accordance with embodiments described herein. A mixture including a water-insoluble grape seed extract source material is obtained (step 610). Ethanol is added (step 612) to the mixture to form an ethanolic solution. The ethanolic solution is filtered (step 614) to obtain a permeate including ethanol and at least a portion of the water-insoluble grape seed extract source material dissolved in ethanol. Ethanol is removed (step 616) from the permeate to obtain a dried grape seed extract that is soluble in ethanol and insoluble in water (e.g., GSE D).

Table 8 presents experimental measurements of the relative amounts of monomers (e.g., monomeric flavanols, such as catechin and epicatechin), oligomers (e.g., oligomeric flavanols such as proanthocyanidins), and polymers (e.g., polymeric flavanols, such as proanthocyanidins) present in the GSE composition 504 (GSE D). In this particular embodiment, the GSE composition 504 was separated using hydrophilic interaction liquid chromatography (HILIC) with a diol HPLC column (250×4.6 mm, 5 µm particle size) and a diode-array detector (DAD) at 280 nm. The values in the table indicate that GSE D comprises mostly polymers.

TABLE 8

Example percentages of components for composition 504 (GSE D).

| Component | GSE D |
|---|---|
| Monomers (% of HPLC peak area) | 3.2 |
| Oligomers (% of HPLC peak area) | 6.8 |
| Polymers (% of HPLC peak area) | 90 |

Table 9 presents experimental measurements of the amounts of total phenols (determined by Folin-Ciocalteu), (epi) catechin (determined by HPLC), and gallic acid (determined by HPLC), for the GSE composition 504 (GSE D).

TABLE 9

Example percentages of components for composition 504 (GSE D).

| Component | GSE D |
|---|---|
| Total Phenols (g GAE/100 g), Dry Basis | 67.6 |
| wt % Epicatechin (Dry Basis) | 0.6 |
| wt % Gallic Acid (Dry Basis) | 0.3 |

Figure 7:
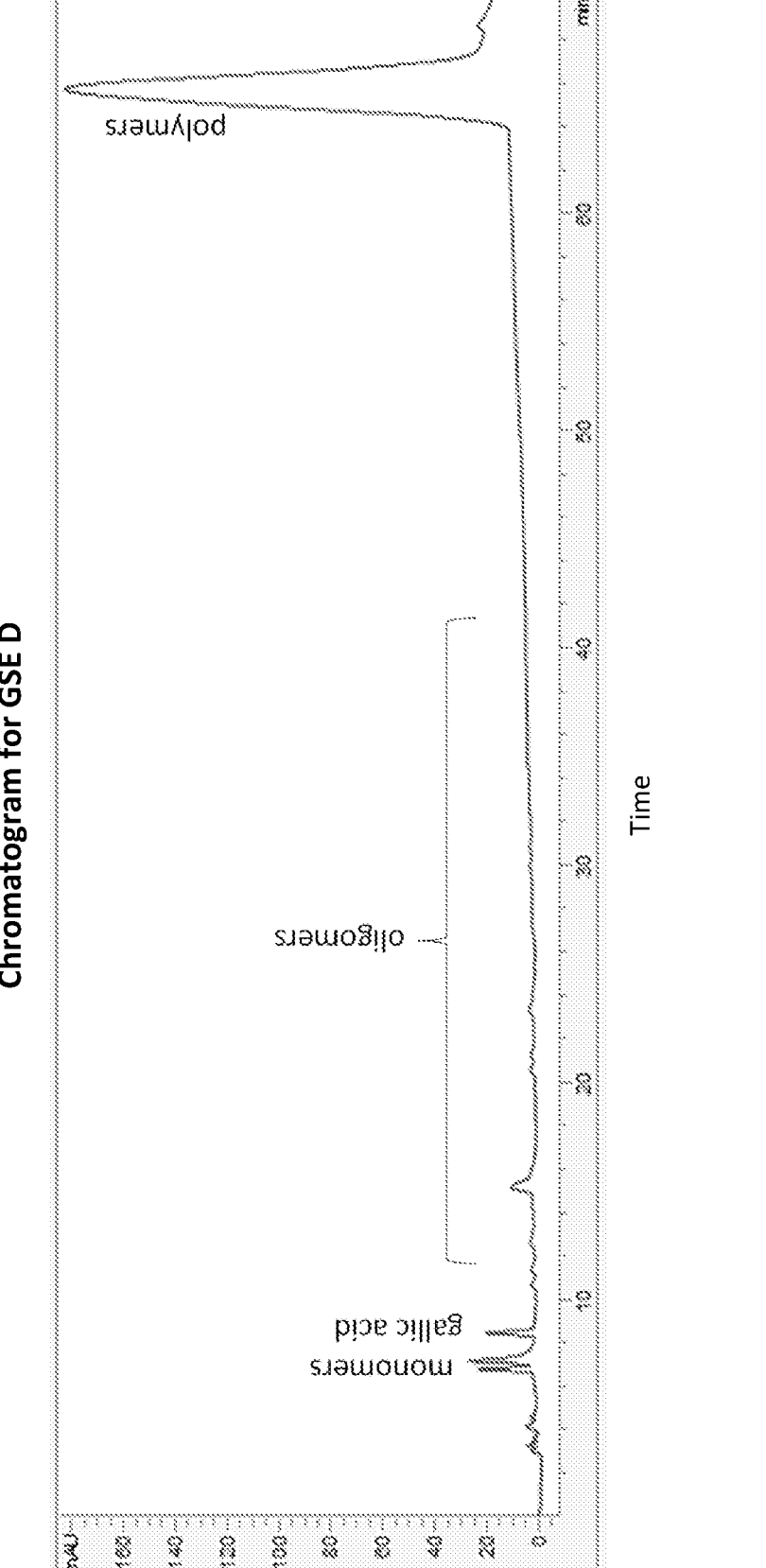
FIG. 7 is a chromatogram for a grape seed extract obtained using using hydrophilic interaction liquid chromatography (HILIC) with a diode-array detector (DAD), at 280 nm, in accordance with certain examples.

FIG. 7 depicts a chromatogram for an example of GSE D, obtained using hydrophilic interaction liquid chromatography (HILIC) with a diol HPLC column (250×4.6 mm, 5 µm particle size) and a diode-array detector (DAD) at 280 nm, in accordance with certain embodiments described herein. The chromatogram includes peaks corresponding to respective components in each composition, with peaks for lower molecular weight components (e.g., monomers) appearing closer to a left-hand side of the x-axis and higher molecular weight components (e.g., polymers) appearing closer to a right-hand side of the x-axis. An area of each peak indicates a concentration or amount of the respective component that is present in the composition taking into consideration the molar absorptivity coefficient of the component of interest. As the figure indicates, GSE D in this example has a high polymer content.

Table 10 includes low, high, and typical values for various parameters associated with the composition 504 (GSE D) produced using the systems and methods described herein, in accordance with certain embodiments. The listed parameters can encompass possible ranges for the parameters that can be obtained depending on whether or not the GSE source material was prepared using tannase or acidification, as described herein. Each listed value can be a minimum, maximum, or average value (e.g., in a range of values). Various embodiments include any parameter value (e.g., integer or decimal value) within the cited ranges. For example, the total phenols value for GSE D can be greater than, less than, or equal to 55, 56, . . . , 74, or 75 g GAE/100 g. Express support and written description of these values for each parameter are hereby represented.

TABLE 10

Exemplary parameters for composition 504 (GSE D).

| Feature | GSE D | | |
|---|---|---|---|
| | Low | High | Typical |
| Total Phenols (g GAE/100 g), Dry Basis | 55 | 75 | 68 |
| wt % Gallic Acid, Dry Basis | 0 | 2 | 0.3 |
| wt % Total Catechin + Epicatechin, Dry Basis | 0 | 2 | 0.6 |
| % Epicatechin Gallate (ecg) Terminal Units | 0 | 6 | 3.3 |
| % Epicatechin Gallate (ecg) Extension Units | 0 | 12 | 9.1 |
| mDP | 3 | 7 | 4.4 |
| Monomers (% of HPLC peak area) | 0 | 5 | 3 |
| Oligomers (% of HPLC peak area) | 0 | 11 | 7 |
| Polymers (% of HPLC peak area) | 75 | 99 | 90 |
| Solubility in Distilled Water (g/mL at 21.6° C.) | 0 | 0.00001 | 0 |
| Solubility in Ethanol (g/mL at 21.6° C.) | 0.001 | 0.1 | 0.014 |
| Water Activity at 21.4° C. | 0.1 | 0.5 | 0.41 |
| % Moisture | 1 | 11 | 10.7 |

The GSE composition 504 (GSE D) produced using the system 500 can have a wide variety of applications. For example, the composition 504 can be used as an additive for food, beverages, confectionary, winemaking, cidermaking, brewing, spirits, food and beverage antioxidant supplements, food and beverage preservation, functional food and beverages, flavoring, confectionary, chocolate, metal chelators, leather tanning, dietary supplements, cosmetics, nutraceuticals, or medicinal applications. In some embodiments, the composition 504 (GSE D) can be used to produce wines with improved mouthfeel, body, structure, and/or astringency.

While much of the subject matter described herein relates to grape seed extracts, it is understood that the systems, methods, and compositions described herein can be used with or derived from other materials. For example, the systems and methods can be extended beyond grape seed materials to include fractionation of any natural or man-made source, extract, or fraction that contains mixtures of any of the following: proanthocyanidins or condensed tannins (e.g., procyanidins, propelargonidins and/or prodelphinidins), hydrolyzable tannins (e.g., gallotannins and/or ellagitannins), carbohydrates, oligosaccharides, polysaccharides (e.g., pectin), aminopolysaccharides (e.g., chitosans), oligonucleotides, polyamides (e.g., peptides or proteins), polyacrylamides, polyamines, polyacrylic acid copolymers, polysorbates, polyketides, poloxamers, polyethylene glycols (alternatively referred to as polyethylene oxide or polyoxy-ethylene alcohols), polyvinyl alcohols, macromolecular complexes (e.g., tannin-protein, tannin-polysaccharide, pro-tein-polysaccharide, etc.), polymeric pigments (e.g., antho-cyanin-ethyl-flavanols, pyranoanthocyanin-flavanol, antho-cyanin-flavanol, polymerized anthocyanins, portisins, etc.), melanoidins, phlobaphenes, phlobatannins, (bio) synthetic derivatives, chemically modified, and any combinations thereof.

In various embodiments, the monomers present in the compositions (e.g., GSE A, B, C, and D) and materials (e.g., grape seeds, grape skins, and GSE source material 108) described herein can be or include (+) catechin, (−) epicat-echin, (−) epicatechin-3-O-gallate, and/or (−) epigallocat-echin gallate. The oligomers and polymers present in the compositions and materials described herein can include or be composed of any of these monomers, their isomers, alone or in any combination. For example, in heated aqueous solutions, (+)-catechin and (−)-epicatechin can epimerize to (+)-epicatechin and (−)-catechin, respectively.

Definitions

The phraseology and terminology used herein is for the purpose of description and should not be regarded as lim-iting.

The term "approximately", the phrase "approximately equal to", and other similar phrases, as used in the specifi-cation and the claims (e.g., "X has a value of approximately Y" or "X is approximately equal to Y"), should be under-stood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those ele-ments specifically identified. Thus, as a non-limiting example, a reference to "A and/or B", when used in con-junction with open-ended language such as "comprising" can refer, in one embodiment, to A only (optionally includ-ing elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of." or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B." or, equivalently "at least one of A and/or B") can refer, in one embodiment, to at least one, optionally including more than one, A, with no B present (and option-ally including elements other than B); in another embodi-ment, to at least one, optionally including more than one, B, with no A present (and optionally including elements other than A); in yet another embodiment, to at least one, option-ally including more than one, A, and at least one, optionally including more than one, B (and optionally including other elements); etc.

The use of "including," "comprising." "having." "con-taining," "involving." and variations thereof, is meant to encompass the items listed thereafter and additional items.

Use of ordinal terms such as "first." "second." "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value pre-sented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention.

Accordingly, the described embodiments are to be con-sidered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

EXAMPLES

Example 1—Production of GSE C with Acid Adjustment and without Tannase

In this example, GSE C was produced from a GSE source material (e.g., GSE 108) obtained with acidification (e.g., pH of about 2) and without tannase treatment. The GSE source material was filtered with an ultrafiltration filter (e.g., filter 120) having a molecular weight cutoff of 1,000 Daltons to produce a permeate (e.g., permeate 124). The permeate (about 44 L) was rotavaped using a BÜCHI R-220 SE at 65° C. and a vacuum pressure (about 40 mbar) to remove excess water down to a small volume (about 1.5 to 2 L). The concentrated permeate was loaded on a glass column (120× 400 mm) packed with XAD7HP resin (300 mL BV) via a peristaltic pump (WATSON-MARLOW model 5205). Pump and elution flowrates were both about 24 mL/min. Following the loading of permeate, the column was washed with water (about 600 mL) to remove impurities (e.g., sugars, organic acids, salts, insoluble particulates, etc.). Tannins were desorbed from the resin and eluted from the column with ethanol (about 70-99%) at a flowrate of about 5 mL/min. Desorbed condensed tannins and ethanol were rotary evaporated to remove ethanol and concentrate using thin film evaporation under reduced pressure with BÜCHI rotavapors (e.g., R-210, R-215). Exemplary GSE compositions produced according to this method are described in Tables 2, 4, 5, and 7.

Example 2—Production of GSE C without Acid Adjustment and without Tannase

In this example, GSE C was produced from a GSE source material (e.g., GSE 108) obtained without acidification (e.g., pH of about 4) and without tannase treatment. The GSE source material was filtered with an ultrafiltration filter (e.g., filter 120) having a molecular weight cutoff of 1,000 Daltons to produce a permeate (e.g., permeate 124). The permeate (about 41 L) was loaded on a glass column (120×400 mm) packed with XAD7HP resin (300 mL BV) via a peristaltic pump (WATSON-MARLOW model 5205). Pump and elution flowrates were both about 24 mL/min. Following permeate loading, the column was washed with water (about 600 mL) to remove impurities (e.g., sugars, organic acids, salts, insoluble particulates, etc.). Tannins were desorbed from the resin and eluted from the column with ethanol (about 70-99%) at a flowrate of about 5 mL/min. Desorbed condensed tannins and ethanol were rotary evaporated to remove ethanol and concentrate using thin film evaporation under reduced pressure with BÜCHI rotavapors (models R-210, R-215). Exemplary GSE compositions produced according to this method are described in Tables 3, 4, 6, and 7.

Example 3—Production of GSE C with Acid Adjustment and with Tannase

In this example, GSE C was produced from a GSE source material (e.g., GSE 108) obtained with acidification (e.g., pH of about 2) and with tannase treatment. The GSE source material was filtered with an ultrafiltration filter (e.g., filter 120) having a molecular weight cutoff of 1,000 Daltons to produce a permeate (e.g., permeate 124). The permeate (about 41 L) was loaded on a glass column (120×400 mm) packed with XAD7HP resin (300 mL BV) via a peristaltic pump (WATSON-MARLOW model 5205). Pump and elution flowrates were both about 32 mL/min. Following the loading of permeate, the column was washed with water (about 600 mL) to remove impurities (e.g., sugars, organic acids, salts, insoluble particulates, etc.). Tannins were desorbed from the resin and eluted from the column with ethanol (about 70-99%) at a flowrate of about 5 mL/min. Desorbed condensed tannins and ethanol were rotary evaporated to remove ethanol and concentrate using thin film evaporation under reduced pressure with BÜCHI rotavapors (models R-210, R-215). Exemplary GSE compositions produced according to this method are described in Tables 2, 4, 5, and 7.

Example 4—Production of GSE C without Acid Adjustment and with Tannase

In this example, GSE C was produced from a GSE source material (e.g., GSE 108) obtained without acidification (e.g., pH of about 4) and with tannase treatment. The GSE source material was filtered with an ultrafiltration filter (e.g., filter 120) having a molecular weight cutoff of 1,000 Daltons to produce a permeate (e.g., permeate 124). The permeate (about 42 L) was loaded on a glass column (120×400 mm) packed with XAD7HP resin (300 mL BV) via a peristaltic pump. Pump and elution flowrates were both about 32 mL/min. Following the loading of permeate, the column was washed with water (about 600 mL) to remove impurities (e.g., sugars, organic acids, salts, insoluble particulates, etc.). Tannins were desorbed from the resin and eluted from the column with ethanol (about 70-99%) at a flowrate of about 5 mL/min. Desorbed condensed tannins and ethanol were rotary evaporated to remove ethanol and concentrate using thin film evaporation under reduced pressure with BUCHI rotavapors (models R-210, R-215). Exemplary GSE compositions produced according to this method are described in Tables 3, 4, 6, and 7.

Example 5—Production of GSE D

GSE D was produced from a GSE retentate obtained using an OMNIA microfilter having a pore size of about 0.2 μm and a molecular weight cutoff of about 100K Daltons. About 3.8 L of the retentate was vacuum filtered through a BÜCHNER funnel and WHATMAN #1 filter paper. The clarified filtrate (about 3.25 L) was loaded into the top of a glass column charged with XAD17HP resin (500 mL BV). The filtrate was washed with water (about 1 L) and then desorbed with a mixture of 75% ethanol and 25% water (about 1 L). Solvents were removed from the ethanolic eluate in vacuo (using a BÜCHI rotary evaporator) to obtain about 14.5 g of a brownish red solid (e.g., containing a mixture of GSE A, GSE B, and GSE C). The filter cake produced from the vacuum filtration was allowed to dry under ambient conditions to obtain about 204 g of a mixture containing GSE D and some insoluble solids.

In a separate experiment, a second aliquot (about 3.8 L) of the GSE retentate produce using the OMNIA microfilter was vacuum filtered through a BUCHNER funnel with WHATMAN #1 filter paper. The solids and liquid retained by the vacuum filtration were centrifuged at about 8000 rpm, for about 5 min (using a SORVALL LYNX 6000 centrifuge, provided by THERMO SCIENTIFIC). The solids were washed with fresh water (about 100 mL) and mixed with high-proof ethanol (190 proof; about 1 L). The solids and ethanol were mixed using an immersion homogenizer (at about 2500 rpm) to facilitate dissolution of a portion of the solids in the ethanol. The mixture of solids, dissolved solids, and ethanol was vacuum filtered using a BÜCHNER funnel and WHATMAN #1 filter paper. The filtrate was rotary evaporated to dryness and dried further over phosphorus pentoxide ($P_2O_5$) to produce about 39.5 g of GSE D (a dark, crusty solid). Remaining solids were dried under ambient conditions to produce about 80.5 g of insoluble solids (e.g., solid material 544). Exemplary GSE compositions produced according to this method are described in Tables 8, 9, and 10.

It is understood that the present invention may take many forms and embodiments. Accordingly, several variations may be made in the foregoing without departing from the spirit or scope of the invention. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A system for processing a grape seed extract, the system comprising:

a source for a grape seed extract source material;

a first filter configured to filter the grape seed extract source material to obtain a first retentate and a first permeate;

a first dryer configured to dry the first retentate to obtain a first grape seed extract comprising a first mean degree of polymerization;

a second filter configured to filter the first permeate to obtain a second retentate and a second permeate;

a second dryer configured to dry the second retentate to obtain a second grape seed extract comprising a second mean degree of polymerization less than the first mean degree of polymerization;

a purifier configured to purify the second permeate to obtain a purified liquid; and a third dryer configured to dry the purified liquid to obtain a third grape seed extract comprising a third mean degree of polymerization less than the second mean degree of polymerization.

2. The system of claim 1, wherein the first filter comprises an ultrafiltration filter having a molecular weight cutoff from about 80,000 Daltons to about 250,000 Daltons.

3. The system of claim 1, wherein the second filter comprises an ultrafiltration filter having a molecular weight cutoff from about 800 Daltons to about 5,000 Daltons.

4. The system of claim 1, wherein at least one of the first dryer, the second dryer, or the third dryer comprises a refractance window dryer.

5. The system of claim 1, wherein the purifier comprises a resin column configured to perform an adsorption-elution process to remove sugar and organic acid from the second permeate.

6. The system of claim 1, further comprising at least one concentrator configured to concentrate at least one of the first retentate, the second retentate, or the purified liquid.

\* \* \* \* \*